US008671019B1

(12) United States Patent
Barclay et al.

(10) Patent No.: US 8,671,019 B1
(45) Date of Patent: Mar. 11, 2014

(54) CONTROLLING AND REWARDING GAMING SOCIALIZATION

(75) Inventors: Brian J. Barclay, Atlanta, GA (US);
Andrew C. Guinn, Chicago, IL (US);
Travis N. Nelson, Canton, GA (US);
Richard B. Robbins, Glenview, IL (US);
Danijel Stankovic, Evanston, IL (US);
John R. Werneke, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 78 days.

(21) Appl. No.: 13/411,305

(22) Filed: Mar. 2, 2012

Related U.S. Application Data

(60) Provisional application No. 61/448,907, filed on Mar. 3, 2011.

(51) Int. Cl.
*G06Q 30/00* (2012.01)
*H04N 7/025* (2006.01)
*A63F 9/24* (2006.01)

(52) U.S. Cl.
USPC ...... 705/14.41; 463/25; 705/14.1; 705/14.16; 725/32

(58) Field of Classification Search
USPC .......... 463/25; 705/14.1, 14.16, 14.23, 14.27, 705/14.4, 14.41, 14.66, 14.67; 725/32, 87
See application file for complete search history.

(56) References Cited

U.S. PATENT DOCUMENTS

| | | | |
|---|---|---|---|
| 2007/0005694 A1* | 1/2007 | Popkin et al. | 709/204 |
| 2008/0244666 A1* | 10/2008 | Moon et al. | 725/87 |
| 2008/0318655 A1 | 12/2008 | Davies | |
| 2009/0222551 A1* | 9/2009 | Neely et al. | 709/224 |
| 2009/0234744 A1* | 9/2009 | Kapila | 705/14 |
| 2010/0191589 A1* | 7/2010 | Matte | 705/14.16 |
| 2010/0255899 A1 | 10/2010 | Paulsen | |

(Continued)

FOREIGN PATENT DOCUMENTS

| | | |
|---|---|---|
| WO | WO-03013678 | 2/2003 |
| WO | WO 2007076321 | 7/2007 |
| WO | WO-2009002978 | 12/2008 |
| WO | WO-2010114764 | 10/2010 |

OTHER PUBLICATIONS

Chris Sieroty, Casinos looking towards social media to entice customers, Jan. 14, 2011, http://www.casinocitytimes.com/article/casinos-looking-towards-social-media-to-entice-customers-59397.*

(Continued)

*Primary Examiner* — Dmitry Suhol
*Assistant Examiner* — Jason Yen
(74) *Attorney, Agent, or Firm* — DeLizio Gilliam, PLLC

(57) ABSTRACT

A wagering game system and its operations are described. In some embodiments, the operations include receiving a message that was published from a social-communication application of a social network website, selecting a first phrase (e.g., promotional expression, by a user, regarding the wagering game venue) from the message, and comparing the first phrase to a plurality of second phrases (e.g., characteristics associated with a wagering game venue) accessible via a wagering game server. The operations can further include detecting that the first phrase is substantially similar to at least one of the plurality of the second phrases, and providing an award (e.g., loyalty points) in response. In some embodiments, the value of the award is based on a condition associated with the message, publication of the message, etc.

24 Claims, 12 Drawing Sheets

(56) References Cited

U.S. PATENT DOCUMENTS

| | | | |
|---|---|---|---|
| 2010/0312649 A1* | 12/2010 | Lurie | 705/14.66 |
| 2011/0004525 A2* | 1/2011 | Byrne | 705/14.67 |
| 2011/0130194 A1* | 6/2011 | Anderson et al. | 463/25 |
| 2011/0131085 A1* | 6/2011 | Wey | 705/14.16 |
| 2011/0145049 A1* | 6/2011 | Hertel et al. | 705/14.23 |
| 2011/0145052 A1* | 6/2011 | Lin et al. | 705/14.27 |
| 2011/0167445 A1* | 7/2011 | Reams et al. | 725/32 |
| 2011/0218846 A1* | 9/2011 | Fieldman et al. | 705/14.16 |
| 2011/0231240 A1* | 9/2011 | Schoen et al. | 705/14.41 |
| 2012/0004028 A1 | 1/2012 | Guan et al. | |

OTHER PUBLICATIONS

Ivan Walsh, Mailbag: How Much Can Freelance Writers Charge for Blogging, Feb. 2, 2011, http://www.makealivingwriting.com/2011/02/02/mailbag-freelance-writers-charge-for-blogging/.*

* cited by examiner

CONTROLLING AND REWARDING GAMING SOCIALIZATION

RELATED APPLICATIONS

This application claims the priority benefit of U.S. Provisional Application Ser. No. 61/448,907 filed Mar. 3, 2011.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, control and reward gaming-related socialization.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operations performed by some embodiments while the third section describes additional example embodiments. The fourth section describes example operating environments while the fifth section presents some general comments.

Introduction

This section provides an introduction to some embodiments.

Social communication is on the rise. Internet users are enjoying a proliferation of social networking venues, such as social networking websites. Social networking websites allow users to create user accounts with one or more unique identifiers that represent an online persona. One example of a unique identifier is an "avatar". Avatars are graphical, "cartoon-like" depictions of a social network persona. These online personas and associated avatars add to the fun of belonging to a social network. Another example of a unique identifier is an online name. Many of those Internet users are also wagering game enthusiasts. Many social networking venues (e.g., websites), however, present an unsatisfactory experience to those users who would enjoy integration with gaming-related features. Further, casinos and wagering game providers desire to incentivize users of social networking venues to visit casinos or online wagering venues that include wagering game content.

Figure 1:
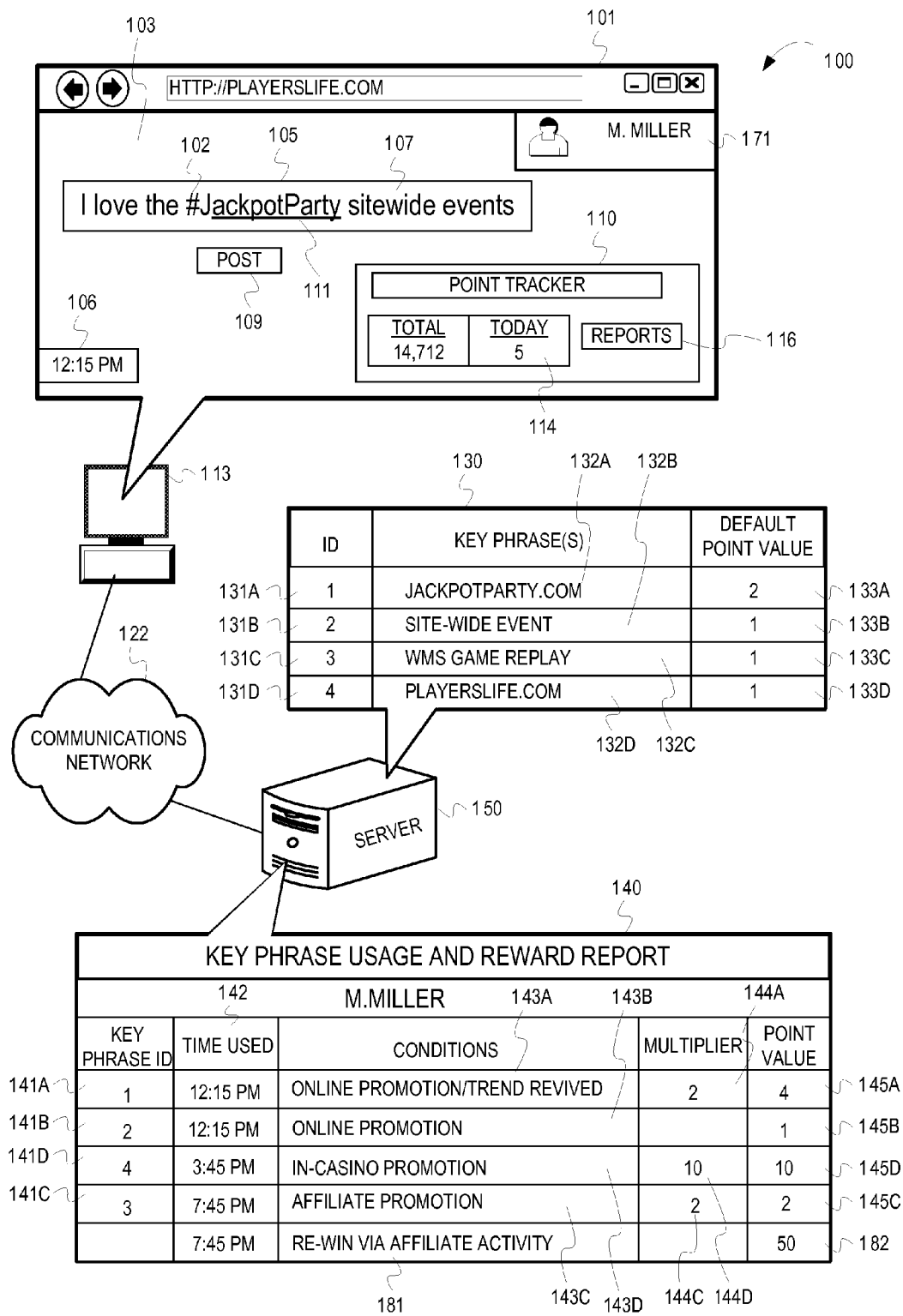
FIG. 1 is an illustration of tracking and rewarding of social communications associated with gaming, according to some embodiments.

FIG. 1 is a conceptual diagram that illustrates an example of tracking and rewarding social communications associated with gaming, according to some embodiments. In FIG. 1, a wagering game system ("system") 100 includes a computer 113 connected to a server 150 via a communications network 122. The server 150 hosts a user account (e.g., a user account for the user "Marcus Miller" indicated via the user account console 171). A user (i.e., Marcus Miller) can log in to the user account via a web browser 101 presented by the computer 113. The web browser 101 can present a webpage 103 for a social networking website (e.g., "Playerslife.com")

hosted by the server 150. The server 150 can provide content, such as social networking communication mechanisms that can publish a message electronically to one or more individuals or groups of individuals, such as to social contacts associated with the user (e.g., via one or more other user accounts linked to Marcus Miller's user account). The social networking communication mechanism can send, post, submit, or otherwise transmit the message electronically to, or for, one or more individuals or groups of individuals. Some examples of social networking communication mechanisms may include, but are not necessarily limited to blogs (e.g., text and/or other media), micro-blogs, profile status update features, forums, chats, news feeds, text messaging, mass messaging, email, etc. The user (e.g., Marcus Miller) can enter a message 107 (e.g., a text string) into a user input area 105 (e.g., a text input control, a web form field, etc.). The message 107 can include textual characters. The textual characters can also include one or more special characters (e.g., the pound character "#"), which indicates a tag (e.g., via a tag symbol 102) that tags a word or phrase as being a specialized expression. The webpage 103 also provides a control 109 to publish (e.g., post, submit, transmit, etc.) the message 107. Multiple users and/or accounts can access the published message and/or receive automated notifications of the published message.

The message 107 ("I love the #JackpotParty sitewide events") is a personal expression, or statement, of interest, or promotion, indicated by the user regarding specific features or elements of a gaming venue, such as the site-wide event feature of the online casino website, Jackpotparty.com®. The server 150 can analyze the message 107 after it is published to search for promotional expressions (e.g., words, phrases, etc.) that promote the gaming venue. For example, the server 150 can parse the message 107 and search for first phrases (e.g., words or combinations of words) that match, or are substantially similar to, second phrases from a group, or library, of key words or phrases, as indicated in a list 130. For example, the list 130 includes at least four key phrases: key phrase 132A ("Jackpotparty.com"), key phrase 132B ("sitewide event"), key phrase 132C ("WMS game replay"), and key phrase 132D ("Playerslife.com"). The key phrases 132A, 132B, 132C, and 132D ("132A-132D") are separate words or phrases that describe gaming-related items or activities such as, but not limited to, a gaming venue, a feature or activity of a gaming venue, a wagering game, a type of wagering game, a gaming provider, a casino, a player account, a group-game challenge, an invitation to perform gaming activity, a recording of gaming activity, a virtual wagering-game asset or trophy, a gaming benefit, a wager, etc.

The key phrases 132A-132D can be stored in a relational database. The key phrases 132A-132D include identifiers 131A, 131B, 131C, and 131D ("131A-131D") that, respectively, identify the key phrases 132A-132D. Each of the key phrases 132A-132D also include award values, such as default point values 133A, 133B, 133C, and 133D ("133A-133D"). The default point values 133A-133D indicate non-monetary values for points that the server 150 can award for usage of one or more of the key phrases 132A-132D within the message 107.

The server 150 tracks, in a report 140, usage, and rewards for the usage, of the key phrases 132A-132D. For example, the report 140 indicates key phrase identifiers 141A, 141B, 141C, and 141D ("141A-141D"), which correspond to the key phrase identifiers 131A-131D in the list 130. The report 140 also includes time stamp indicators 142 that indicate times, dates, etc. for the use of the key phrases 132A-132D. The report 140 also specifies requirements, or conditions 143A, 143B, 143C, and 143D ("143A-143D") associated with the usage of the key phrases 132A-132D. The conditions 143A-143D can be specified by a set of rules or requirements stored in, and/or accessible to, the server 150. The server 150 can detect attributes (e.g., properties, characteristics, conditions, etc.) associated with publication of the message 107 and compare the attributes to the rules or requirements. The report 140 also specifies augmentation values, or multipliers 144A, 144C, and 144D, associated, relatively, with the conditions 143A, 143C, and 143D. The server 150 can also associate the multipliers 144A, 144C and 144D with the rules or requirements. The report 140 also specifies awarded point values 145A, 145B, 145C, and 145D ("145A-145D"), associated with the usage of the key phrases 132A-132D based on the conditions 143A-143D. Two of the conditions, 143A and 143B, will be explained in more detail in the paragraph below, including the usage of the multiplier 144A, to generate two of the awarded point values 145A and 145B. Others of the conditions (i.e., 143C and 143D) will be described in FIG. 3 further below.

Regarding the two conditions 143A and 143B, for instance, at 12:15 PM (e.g., indicated via the clock 106) the message 107 is published. The server 150 analyzes the message 107 and identifies that two phrases from the message "JackpotParty" and "sitewide events" are substantially similar to two key phrases, key phrase 132A and key phrase 132B. The server 150, therefore, notates the usage of the key phrases 132A and 132B in the report 140 and awards the awarded point values 145A and 145B, which correspond to the use of the key phrases 132A and 132B at 12:15 PM. For the awarded point value 145B, the server 150 recognizes that the usage of the key phrase 131B is a basic promotional usage of the phrase "site-wide events", and therefore assigns the default point value 133B from the list 130 as the awarded point value 145B. In other words, the server 150 awards the awarded point value 145B (the value of "1") exactly equivalent to the default point value 133B (the value of "1"). In some embodiments, however, the server 150 can dynamically augment one or more of the default point values 133A-133D based on conditions associated with the publication of the message 107. For instance, at 12:15 PM, the user utilized the tag symbol 102 for the phrase "JackpotParty." The phrase "JackpotParty," when used in combination with the tag symbol 102 at that particular time (12:15 PM) caused a conversation stream associated with the topic "JackpotParty" to trend upward when the topic was trending downward via a social networking website. The server 150, therefore, dynamically assigns the multiplier value 144A because of the time-related conditions and the trending conditions associated with the usage of the key phrase 132A at 12:15 PM. The server 150 multiplies the default point value 133A (the value of "2") by the multiplier value 144A (the value of "2"), to generate the awarded point value 145A (the value of "4").

In some embodiments, the system 100 provides a point counter 110 that dynamically, or immediately, shows a point count increase, or a potential point count that could result if a promotional expression were made via a social communication mechanism. For example, at 12:15 PM, after the user receives the five points for usage of the key phrases 132A and 132B, the point counter 110 increase a daily count indicator 114 to a numerical value of "5." The point counter 110 can show additional information, including reports. For example, activation of reporting control 116 can present various types of reports for points earned, usage of promotional phrases, etc., for any time range, subject matter range (e.g., on specific tagged topics), etc., including, but not limited to, any or all of the information from the report 140.

In some embodiments, the system 100 utilizes relationships between users (e.g., between the Marcus Miller user and other users of the social network). In some embodiments, the relationship between users is as affiliate relationship. An affiliate relationship can include, for instance, a linked, or associated relationship between users, where an activity performed by a first user is attributed to a second user because of the associated relationship. The first user receives a form of benefit because of the second user's activity. In some embodiments, the first user can also receive a portion (e.g., a proportional amount) of benefits received by the first user. The affiliate relationship can be a result of efforts that the first user performed to entice the second user to register for, and obtain, a player account for a social networking venue or a wagering game venue. In some embodiments, the server 150 can detect that a link 111 included in the message 107 is activate by users (e.g., affiliated users, total users, a combination, etc.). The link 111 is to an online gaming venue, such as Jackpotparty.com®. The server 150 can track a number of times that other users activate the link 111 and visit the website. The sever 150 can award points that vary in value based on the number of activated links to the online gaming venue (e.g., the server 150 can increase any of the multipliers 144A, 144C, or 144D, or generate other multipliers, based on a number of links that were activated via the message 107 after the message 107 was published). Tracking activated links is only one way of tracking activities and/or awards between users. Other examples are described further below, such as in FIG. 3.

Further, some embodiments of the inventive subject matter describe examples of controlling and rewarding gaming socialization in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments one or more of the operations can be performed in parallel. Moreover, some embodiments can perform more or less than all the operations shown in any flow diagram.

Figure 2:
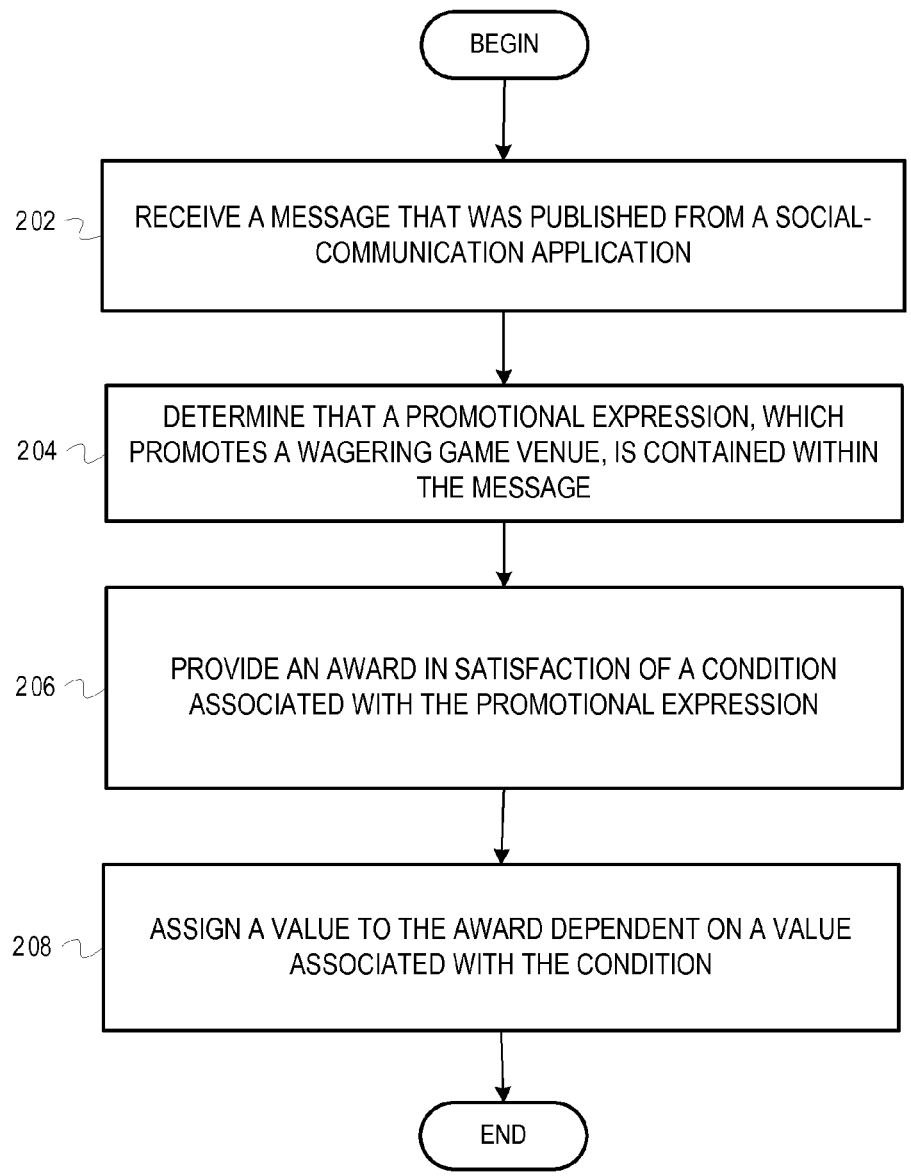
FIG. 2 is a flow diagram 200 illustrating tracking and rewarding social promotions of wagering game activity, according to some embodiments.

FIG. 2 is a flow diagram ("flow") 200 illustrating tracking and rewarding social promotions of wagering game activity, according to some embodiments. This description will refer to FIGS. 1 and 3 in conjunction with FIG. 2. In other words, FIGS. 1 and 3 help illustrate the flow of FIG. 2 according to some embodiments.

In FIG. 2, the flow 200 begins at processing block 202, where a wagering game system ("system") receives a message that was published from a social-communication application. For example, a user posts a social networking message via a social communication application (e.g., a user updates a profile status via FaceBook®.com, a user submits a Tweet via Twitter.com, a user posts a blog or forum entry via PlayersLife®.com, a user submits a chat entry, a user sends an email, etc.). The social-communication application may be a social communication mechanism, as described previously. The system can detect that the message is associated with a player account. For example, the system can link, or otherwise associate, a social networking account that belongs to the user with a wagering game player account that belong to the user (e.g., the system can provide a tool where a user, such as Marcus Miller, can manually link his Facebook®.com account to his PlayersLife.com® account). In some embodiments, the message may be sent via the social networking website. In other embodiments, the message may be sent via a wagering game machine, or other secondary application provided via a wagering game machine, such as an in-game chat application. In some embodiments, the message can direct a user to a wagering game venue, via an affiliate tracking mechanism (e.g., see link 111 described in FIG. 1). In some embodiments, the social communication application can dynamically submit the message to a gaming server (e.g., via data provided in a link/URL, via an email carbon copy, via a chat widget submittal, etc.). In other embodiments, the gaming server can search for the message (e.g., scan websites, scan blog communications, search chat message, etc. to find the message).

○

The flow 200 continues at processing block 204, where the system determines that a promotional expression, which promotes a wagering game venue, is contained within the message. For example, the system can parse the message into a plurality of words, compare the plurality of words to a library of promotional words and phrases stored on a wagering game server, and detect that at least one of the plurality of words is equivalent to, or substantially similar to, one of the promotional words or phrases, as similarly described in FIG. 1. In some embodiments, the system can search for tags (e.g., specific textual characters, link data, metadata, micro memes, etc.). For example, the tags can be indicated by specific tag symbols (e.g., from a set of special characters) that specify that one of the plurality of words is a promotional word or phrase. For example, the system can search for words that are preceded by an asterisk symbol, a pound symbol, etc. In some embodiments, the system can utilize specific tag symbols provided by a social networking venue that are specifically used via a social communication application for specific reasons. For example, Twitter.com utilizes a hash symbol (the "#" symbol) to specify that a word, or group of words, is being used for a specific topic (a hash symbol is sometimes referred to as a "hash tag" or "hashtag"). Twitter.com provides the hash symbol for users to positively identify the topic for a communication stream by multiple users. In some embodiments, the system can detect the use of the specific characters (e.g., the hash symbol) by a running a query against an application programming interface (API) provided by the social networking venue. In some embodiments, the system can utilize its own unique gaming-related tags or symbols that help users to identify gaming related topics. Users can utilize the a gaming-related hash symbol (e.g., dollar symbols that precede and follow a word or phrase, such as "$Jackpot Party$") to focus communications on gaming-related topics (e.g., to ensure that multiple words that form a gaming phrase are not interpreted as separate words and to identify the words as gaming-related words). The system can track trends, within the scope of the gaming-related topics, and determine whether the use of the tags, and accompanying promotional expressions, cause trends to increase or decrease toward the topic. The system can store key phrases in a relational database that ties the use of the key phrases to player's accounts. The system can transmit information regarding usage of gaming-related key phrases in query strings, cookies, links, etc.

The flow 200 continues at processing block 206, where the system provides an award in satisfaction of a condition associated with the promotional expression. For example, the condition may be that the promotional expression is substantially similar to a word or phrase stored in a key phrase library, that the promotional expression fits a specific form, or that the promotional expression is submitted via a specific website. The condition can be associated with the message, the transmission or receipt of the message, the comparison of the message to promotional phrases, the promotional phrases, etc. In some embodiments, the system can detect that a property associated with publication of the message satisfies the condition. For example, the system can detect that the message is published within a specific time period, detect that the one of the plurality of key phrases causes a topic to trend upward for the social networking website/application, detect that the message is republished via an affiliate user account, etc.

The system can provide the award to incentivize and/or reward the use of promotion expressions/key phrases to a degree and/or value associated with the condition. For instance, the system can incentivize users with awards to keep up a communication trend. In some embodiments, the awards can be in-session encouragement, benefits, content, displays, etc. For instance, the system can indicate a user's promotional efforts via a meter or a leaderboard. In some embodiments, the awards are persistent objects, such as virtual assets (e.g., trophies, accomplishments, etc.) or a number of points (e.g., loyalty or achievement points) associated with a wagering game venue. The system can transfer and store the awards via a player account associated with the wagering game venue. The player account may be linked to a social networking account associated with a social networking website or social communication application.

In some embodiments, the system can apply fraud rules to ensure that a user is not abusing usage of promotional terms and/or key phrases, or is abusing an affiliate reward system. In some embodiments, the system can cap awards to incentivize other gaming activity (e.g., place a cap on points until a player visits a gaming venue).

The flow 200 continues at processing block 208 where the system assigns a value to the award dependent on a value associated with the condition. The value associated with the condition can be a degree of significance of the condition. For example, the system can detect a number of times that a message is republished, and assign a point value based on the number of times. In another example, the system can assign a weight factor, multiplier, etc., that increases, or augments, the value based on a significance value associated with the condition (e.g., see description of multiplier 144A in FIG. 1). Some points may have different types, or tiers, or importance or significance. For example, the system can award a first type of point for one activity and a different type of point for a different activity or for exceeding a threshold of the first activity. For example, some points may only be earnable by performing activities in a casino. Other points may have a first value when used outside a casino and a second, higher, point value when used inside a casino. The system can also assign a limitation to the use of the points within a casino. For instance, some points may be earned outside a casino, but only become active when a player (or a group of the player's friends) goes into a casino and uses the point there for game play on a wagering game machine or for group wagering activities (e.g., slot tournament, play at same bank, etc.). In some embodiments, the in-casino activity can be a continuation of a persistent-state game that is played outside the casino, but by coming into the casino within a certain amount of time, the points are unlocked. Casino activity can also unlock a higher value or type of points.

Some types of key phrases utilized via promotional expressions may have different values based on various factors, or conditions, associated with the publication of the message. Some examples of factors, or conditions, may include, but not be limited to the following:

Usage of key phrases at specific dates and/or times.

Usage of key phrases in combination with different phrases.

Usage of key phrases in combination with, or based on, activities occurring on, or at a gaming venue.

Usage of key phrases based on traffic generated to the website.

Usage of key phrases based on trending topics (e.g., when a topic is trending down, then the award points may be more valuable if a user's activity trends the topic back up.

Usage of key phrases in combination with special tags (e.g., if a special key phrase hash tag has been provided by a website administrator account and the user posts a message with the specific key phrase hash tag within a specific time period).

Re-usage of the message (e.g., a resending of the message).

Activities that a user performs prior to publishing the message and/or a status or condition related to the user's account. For example, the award values may be based on degrees of activity that a user may have performed in relation to the player account, gaming content, etc. (e.g., a click, a download of software, a sign up for an account, a game play, an initial deposit, a wager, a subsequent deposit, net win, etc.).

An affiliate relationship. For example, the system can track a degree of affiliate relationship with another user that reads or uses the published message and/or that reuses the message (e.g., award values increase the more that a message is resent). The system can track the affiliate relationship along a chain of individuals who signed up for a service (e.g., if the user refers a friend to sign-up as a member, then the system can go down the chain of referral sign-ups, along with any individuals that the referral members signed up, with each successive level of the signup chain adding to award values).

Figure 3:
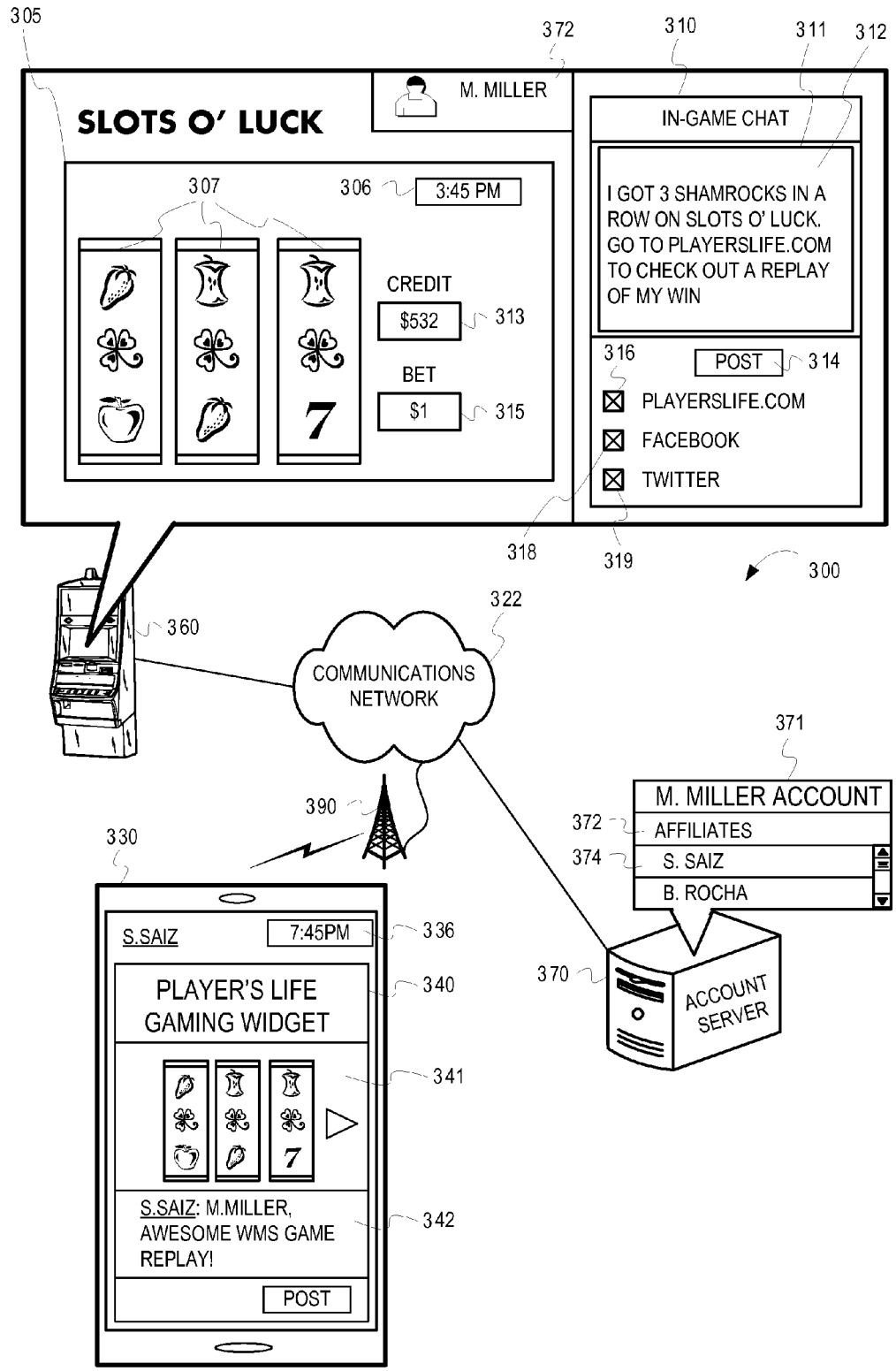
FIG. 3 is an illustration of additional tracking and rewarding of social communications associated with gaming, according to some embodiments.

FIG. 3 is an illustration of additional tracking and rewarding of social communications associated with gaming, according to some embodiments. FIG. 3 helps illustrate some examples of embodiments described in FIG. 2, and also refers back to FIG. 1. In FIG. 3, a wagering game system ("system") 300 includes a wagering game machine 360, an account server 370, and a wireless communications antenna 390 connected to a communications network 322. A mobile device 330 (e.g., a smart phone) is configured to communicate wirelessly with the communications antenna 390. In some embodiments, the wagering game machine 360, the account server 370, the mobile device 330 communicate with, and or receive communications with, a gaming server, such as with the server 150 described in FIG. 1 and/or with the computer 113 described in FIG. 1 (e.g., via the communications network 322 and/or the communications network 122).

In some embodiments, a player (e.g., the user Marcus Miller), earns an award by making promotional comments, related to gaming, via a social communication mechanism, as similarly described in FIGS. 1 and 2. Some of the awards, such as the points earned for using key phrases 132A and 132B, are usable only within a casino, for instance, when playing a wagering game 305 via the wagering game machine 360. The wagering game 305 may be a slot game that includes reels 307, a bet meter 315, a credit meter 313, etc. The user can login to the wagering game machine 360 via a player account 317, indicated via the player login console 372, and play the wagering game 305 via a wagering game session. The player account can access the points earned by the player (e.g., the five points earned at 12:15 PM via the usage of key phrases 132A and 132B) to perform gaming activity for the wagering game 305. During the wagering game session (e.g., at 3:45 PM, as indicated via the clock 306) the player can receive a specific gaming result (e.g., a random result of three shamrocks in a row via a combination of symbols on the reels 307). In response to the gaming result, an in-game chat application 310 automatically inserts a message 312 into a message area 311 of the in-game chat application 310. The message 312 describes the gaming activity. A post control 314 is included in the in-game chat application 310. A player can activate the post control 314 (e.g., via button press, via touchscreen, etc.) which publishes the message 312 to one or more social networking venues (e.g., to Playerslife.com, to Facebook.com, to Twitter.com, etc.) as indicated by selection controls 316, 318, and 319 (selection controls 315, 318, and 319 can instead be included in a user's profile settings). The system 200 can reward the player for publishing the message 312 while in the casino. The message 312 may include a promotional expression that matches a key phrase, such as the key phrase 132D shown in FIG. 1. Referring momentarily to FIG. 1, the server 150 makes an entry into the report 140 indicating the condition 143D, which specifies that the key phrase 132D (i.e., "Playerslife.com") was published while in a casino. Because the key phrase 132D was published via casino activity, the server 150 rewards the promotion more significantly, and utilizes the multiplier 144D (e.g., the value of "10"), which, when multiplied by the default point value 133D (i.e., the value of "1"), results in the total awarded point value 145D (i.e., the value of "10").

Referring back to FIG. 3, a social contact of the first user (e.g., a second user, S. Saiz, who is a friend of the first user, Marcus Miller), may view a publication of the message 312 via the mobile device 330 using a gaming widget 340 installed on the mobile device 330. The account server 370 links the first user, Marcus Miller, via the player account 371, to other accounts, or affiliates 372, one of which is the user account 374 for the second user, S. Saiz. The second user views a replay of the player's achievement (e.g., S. Saiz views at 7:45 PM, as indicated by the clock 336, the replay 341) and posts a comment 342 (e.g., via the post control 343). The comment 342 includes the key phrase 132C (i.e., the phrase "WMS game replay"). The server 150, for example, may award the second user (e.g., via user account 374) the default point value 133C for the usage of the key phrase 132C. However, referring again to FIG. 1, in the report 140, the server 150 specifies a multiplier 144C, because of the affiliate relationship between the first user and the second user, and because the second user commented (e.g., via the gaming widget 340) about content generated via the first user's gaming activity (e.g., the message 312 published during the first user's wagering game session).

In some embodiments, the server 150 may also provide an additional reward because the second user viewed the gaming replay 341. For instance the first user receives a bonus reward in the wagering game 305 and/or receives an award of points (e.g., wins a total award value 182 in the report 140 in FIG. 1, because the condition 181 indicated that a sufficient number of affiliates, such as S. Saiz, viewed the game replay 341). In some embodiments, if enough users click on the post of the message 312, or if the first user can get enough other users to register for an online account to see the posted message 312, the first user may "re-win" the wagering game win. Further, the users who register to see a post of the message 312 can possibly "win" that win value that the first user won, or win some other award (e.g., additional points).

Figure 4:
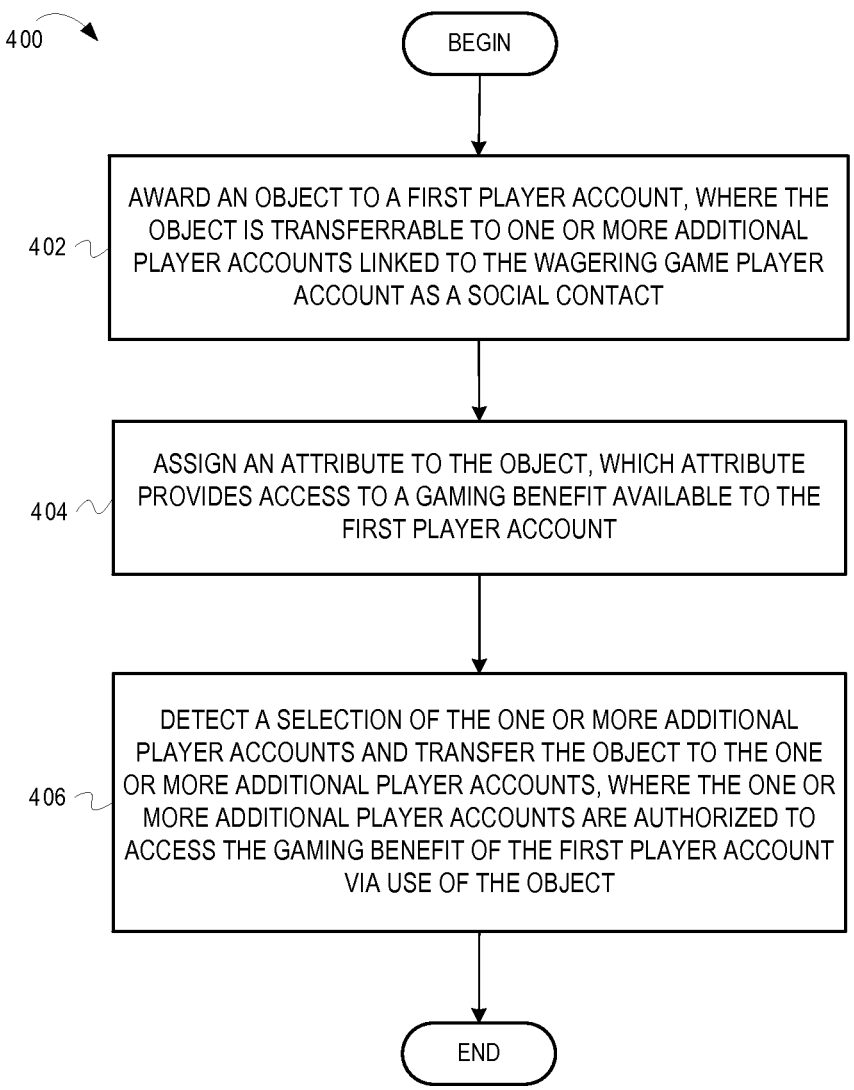
FIG. 4 is a flow diagram 400 illustrating controlling social communication of gaming benefits, according to some embodiments.
Figure 5:
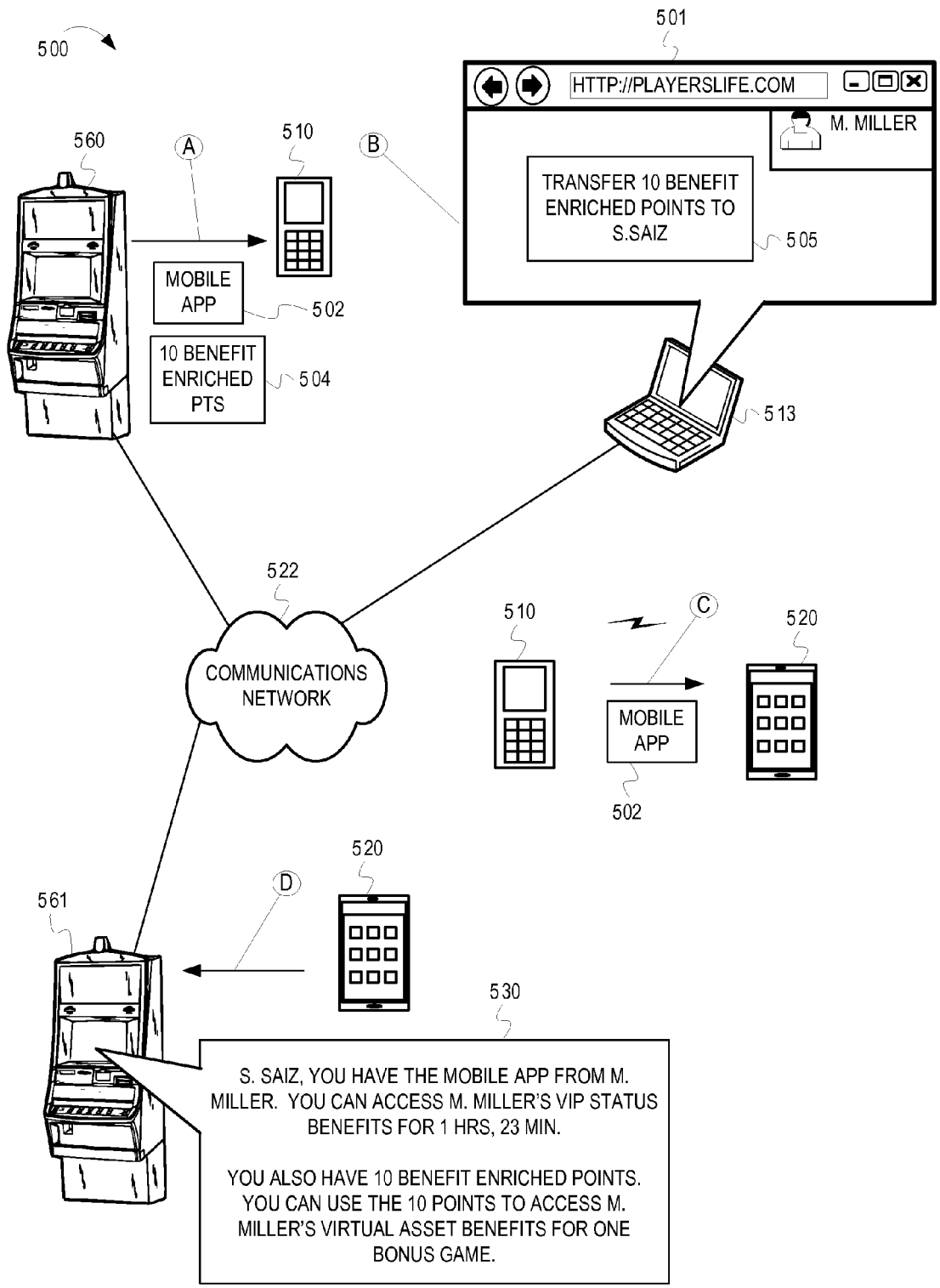
FIG. 5 is an illustration of tracking and rewarding social communication of a mobile gaming application, according to some embodiments.

FIG. 4 is a flow diagram ("flow") 400 illustrating controlling social communication of gaming benefits, according to some embodiments. FIG. 5 is a conceptual diagram that helps illustrate the flow of FIG. 4, according to some embodiments. This description will present FIG. 4 in concert with FIG. 5. In FIG. 4, the flow 400 begins at processing block 402, where a wagering game system ("system") awards an object to a first player account, where the object is transferrable to one or more additional player accounts linked to the player account as a social contact.

The flow 400 continues at processing block 404, where the system assigns an attribute to the object, which attribute provides access to a gaming benefit available to the first player account. For instance, the attribute may grant access to non-monetary benefits associated with a level of status of the player account. In some embodiments the system assigns, or enriches, one or more points with the attribute. For instance, the system can provide a tool for a user to configure specific points via player preference to share benefits that are available to the user (e.g., to share Very Important Person, or "VIP," status benefits for a player account associated with the user). In other embodiments, the system can automatically assign the attribute to the points. In some embodiments, the system provides a mobile application that can be downloaded from a wagering game machine, by a first user, and transferred between mobile devices, from one social contact to another, as described below in FIG. 5. The system can assign the attribute to the mobile application so that when a second user, who receives the mobile application, returns to the casino, the system can provide access to gaming benefits, such as VIP status benefits, of the first user who received the mobile application.

The flow 400 continues at processing block 406, where the system detects a selection of the one or more additional player accounts, and transfers the object to the one or more additional player accounts, where the one or more additional player accounts are authorized to access the non-monetary gaming benefit of the first player account via use of the object. For example, in FIG. 5, a wagering game system ("system") 500 includes a first wagering game machine 560, a second wagering game machine 561 and a computer 513 connected via a communications network 522. The system 500 can also include multiple mobile devices, such as a first mobile device 510 and a second mobile device 520. The first wagering game machine 560 can connect to the first mobile device 510 which belongs to a first user that is logged in to the first wagering game machine 560 during a wagering game session (e.g., to the Marcus Miller user). During the wagering game session, at stage "A," the first wagering game machine 560 detects an event (e.g., the user attains an achievement via game play), and the first wagering game machine 560 transfers a first copy a mobile application 502 to the first mobile device 510. The first wagering game machine 560 also transfer a number of benefit enriched points 504 that have been enriched with attributes that grant access to gaming benefits, such as access rights to gaming benefits that belong to the first user. In some embodiments, at stage "B," the first user transfers the benefit enriched points 504 to a second user (e.g., to the S. Saiz user) via a gaming application 505. The first user can use the computer 513 to present the gaming application 505 via a web browser 501. In addition, at stage "C," the first user can transmit an additional copy of the mobile application 502 to a second mobile device 520 that belongs to the second user (e.g., to S. Saiz) while away from the casino. Later, when the second user visits the casino, and logs on to the second wagering game machine 561, the second mobile device 520 communicates with the second wagering game machine 561, at stage "D." The second wagering game machine 561 detects that the second mobile device 520 has the second copy of the mobile application 502 and grants access to the gaming benefits that belong to the first user (e.g., as indicated via the display 530), such as benefits associated with the first user's status. The second wagering game machine 561 further detects use of the benefit enriched points 504 to access additional gaming benefits, such as access to a virtual asset that belongs to the first user and that grants access to features, and/or enhances the features, of a wagering game or bonus game (e.g., grants access to, or enhances, award multipliers, causes a reduction of gaming elements, increases an expected payout value for a game or wagering game machine, etc.). The player can use the features, or feature enhancements, to increase odds of winning during wagering games.

In some embodiments, the system 500 can provide additional benefits, such as awarding a higher expected value for a number of game plays (e.g., for the first five spins) because the second player account had attained the mobile application 502 from a player with an advanced level of status. In some embodiments, the system 500 can provide rewards to the first player because the second player had a copy of the mobile application 502 on the second mobile device 520. The first user can receive points, for instance, or a portion of the points that the second player wins during the gaming session. In some embodiments, the system 500 can provide awards based on a position in the chain of downloads between players, from the first player account to the second account, via one or more additional mobile devices. In some embodiments, the mobile application 502 can present non-wagering games (e.g., casual games), that the first or second users can play and earn awards (e.g., points). Based on an affiliate relationship, and/or a position in the download chain of the mobile application 502, the system 500 can reward a portion of points earned by the second user, during the non-wagering game play, to the first user's account.

Figure 6:
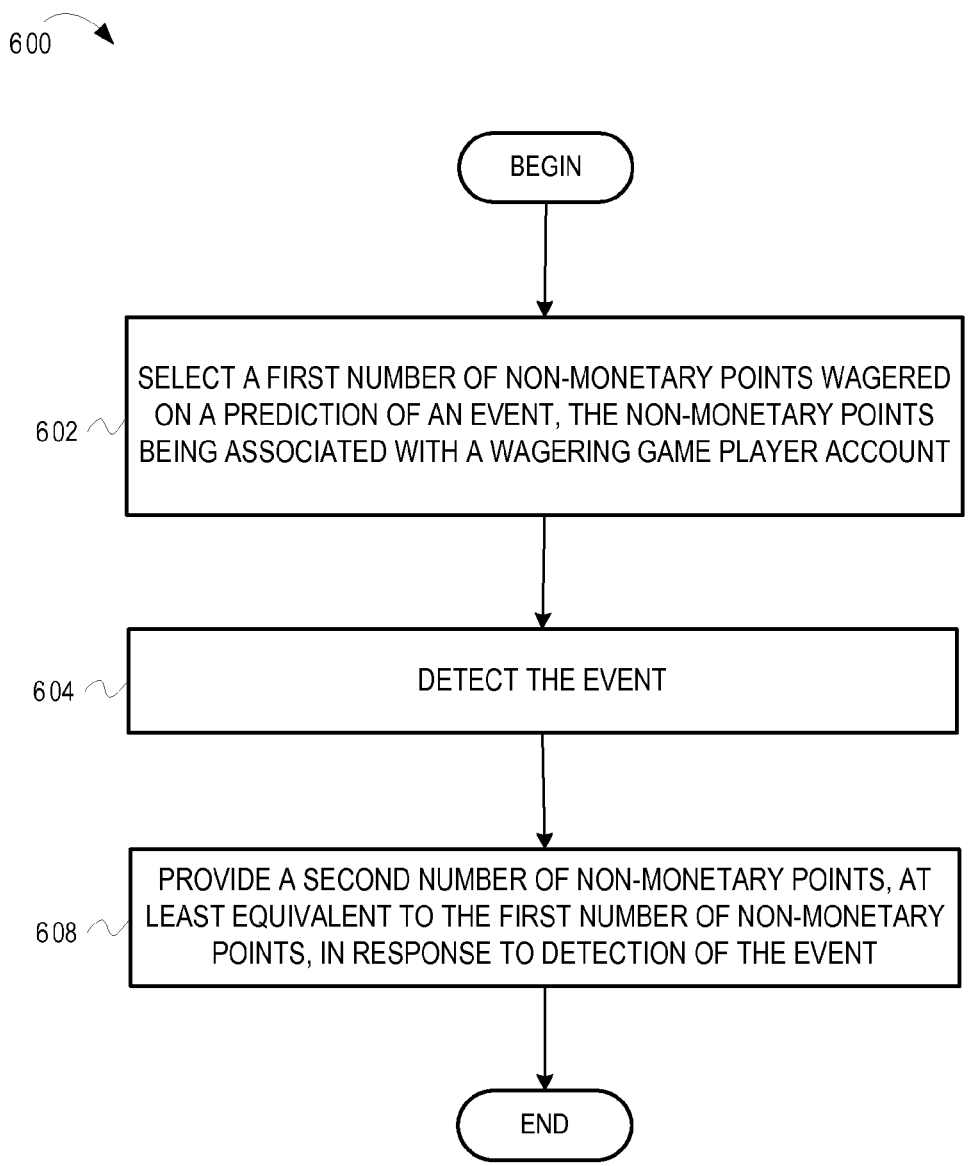
FIG. 6 is a flow diagram 600 illustrating controlling social wagering of player points, according to some embodiments.
Figure 7:
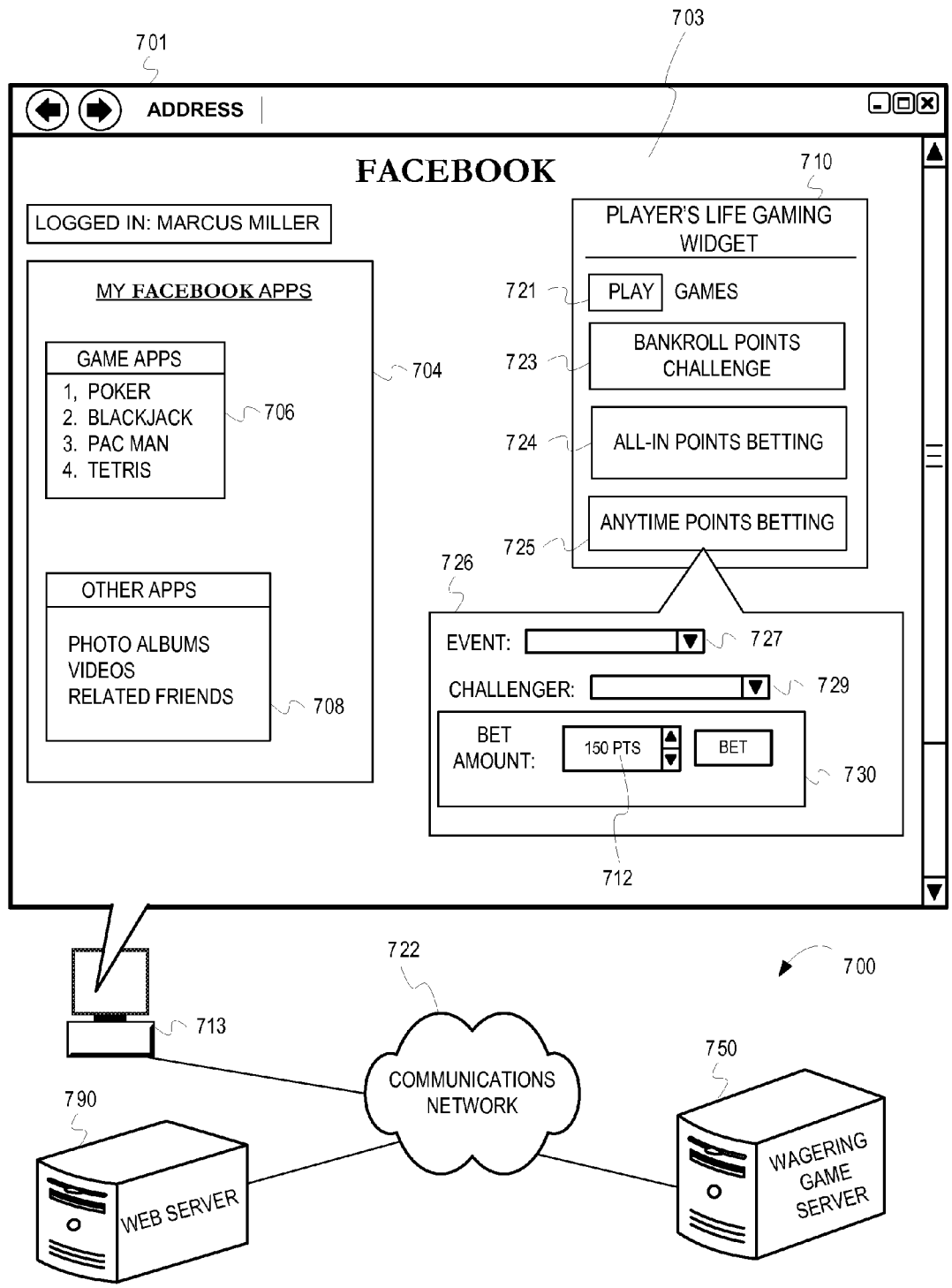
FIG. 7 is an illustration of controlling social wagering of player points, according to some embodiments.

FIG. 6 is a flow diagram ("flow") 600 illustrating controlling social wagering of player points, according to some embodiments. FIG. 7 is a conceptual diagram that helps illustrate the flow of FIG. 6, according to some embodiments. This description will present FIG. 6 in concert with FIG. 7.

In FIG. 6, the flow 600 begins at processing block 602, where a wagering game system ("system") selects a first number of non-monetary points wagered on a prediction of an event, the non-monetary points being associated with a player account. The points, in some embodiments, have no monetary value, or in other words, are not derived from, or equivalent to, a cash or money value. For instance, in some embodiments the points are complimentary points, or loyalty points, earned via activity or use of a service or product, such as services and/or games associated with a gaming venue. Nevertheless, in some embodiments, the points may be transferred or sold for money, or used for activities that normally require money if permitted. FIG. 7 illustrates an example. In FIG. 7, a wagering game system ("system") 700 includes a computer 713 connected to a wagering game server 750 and a web server 790 via a communications network 722. The wagering game sever 750 detects a prediction of an event via a first application, a gaming widget 710. The gaming widget 710 includes a first control 721 that can launch non-wagering games from which a player can earn points. The gaming widget 710 also presents a control 725 that launches a wagering panel 726, through which a player can select a first number (e.g., bet amount 712) of non-monetary points (via a points betting console 730) as a wager on a prediction of any event, with an unknown outcome or uncertainty of occurrence, indicated, via player input, though use of an event indicator 727. The event can occur via play of a non-wagering game launched via the first control 721 (e.g., an accomplishment of a certain goal or level of play within the non-wagering game). The bet amount 712 is a wager that the event will either occur, or not occur. For example, the wager can be on a prediction that a user will perform a specific social communication, such as status post or comment (e.g., a post and/or comment on a Facebook® wall). In some embodiments, the bet can be against others regarding performance of playing casual games. Other bets can be for other events, such as a bet on an occurrence of weather, a bet on an outcome of a sporting event, etc. In some embodiments, the event can be a pre-defined set of activities (e.g., select an event from a dropdown to predict that event will occur), or a non-predefined event specified by the user, a challenger, or a broker. For example, the bet can be that the player will be within a leader board position within a specific time period (e.g., a bet that the player will be a top ten player within a month). The wagering panel 726 can also include a challenge control 729 to challenge another player to the wager of the points. For example, the wagering game server 750 selects an additional account (e.g., an additional social network account and/or an additional player account) in response to a user input via the gaming widget 710. The additional account can be associated with the user as a social contact via the social networking website. The wagering game server 750 can transmit a notification that challenges the additional account to wager a second number of points against the first number of points indicated via the betting console 730. If the player wins, the wagering game server 750 can transfer the second number of points from the second account to the first account in response to detecting the event.

The wagering widget 710 can be an application on a webpage 703 of a social network website (e.g., Facebook.com) where the presentation of the webpage 703 is associated with a social network session for a social network account via a web browser 701. The bet amount 712 is from a player account that is associated with the social network. The webpage 703 can also present social networking applications 704, such as non-wagering games 706 and other applications 708.

The flow 600 continues at processing block 604, where the system detects the event. The event occurs subsequent to the indication of the event (e.g., via the wagering panel 726 in FIG. 7).

The flow 600 continues at processing block 608, where the system provides a second number of non-monetary points at least equivalent to the first number of non-monetary points in response to the detection of the event. For example, the system provides a second number of non-monetary points, at least equivalent to the first number of non-monetary points, in response to said detecting the prediction of the event and in response to said detecting the event.

Additional Example Embodiments

According to some embodiments, a wagering game system ("system") can provide various example devices, operations, etc., to control and reward gaming-related socialization. The following non-exhaustive list enumerates some possible embodiments.

Additional Embodiments of Points Wagering.

In some embodiments, the system can provide "all-in" betting of points (e.g., a player can wager a balance of points that, during game play, the player will attain a gaming achievement or else lose all of the wagered point.). In some instances, if the player wins points at a game, the system can present an option to take the points or gamble all of those points to double them (e.g., via a picking game). FIG. 7 illustrates, via the gaming widget 710, an "all-in" betting control 724. In another example, the system 700 can provide a control 723 that a user can use to bankroll points. For example, a player creates an event, puts up points to win or lose and/or brokers the points on the event. The bankrolling player can earn additional points for bankrolling the points. In some embodiments, bankrolling can be performed within a casino, via a wagering game machine. For example, a player sitting at a wagering game machine bank can offer a certain amount of points to win if another player, at the bank, hits a specific gaming event (e.g., four of a kind, a specific reel-stop combination, etc.). If the other player achieves the specific gaming event, then the other player wins the points bankrolled by the first player. The first player that bankrolled the points could also win points for initiating a points wagering session that utilized the player's bankroll of points. For example, the first player could receive points from the other player (e.g., as a signup fee for the points wagering session and/or if the other player does not attain the event) and/or receive points from a casino for initiating the points wagering session.

Use of Points.

In some embodiments, the system can convert points into gaming credits, for use in gaming, at different conversion levels based on a player's history of play or amount of points (e.g., a VIP can get twice a rate as someone else). In some embodiments, the system can provide points with varying values that a player can use to attain different gaming type rewards. Some tiers of points can have higher payback rates for a wagering game machine. The tiers of points can affect an expected payout value of wagering games on the wagering game machine. For example, use of a highest tier of points can enable a 97% expected payback percentage, use of a next highest tier of points can enable a 96% expected payback percentage, etc., down to a default expected payback percentage for use of no points. In another example, one tier of points can provide an extra percentage payout for a progressive or that causes bonuses or other events to occur more often. In another example, a higher tier of points can increase a number of slot-reel pay lines. In some embodiments, the system can track transference of points between players. The system can track a degree to which points are transferred between players, and the points can increase in value based on the amount of transference. In some embodiments, the system can provide points that players can use to obtain services at a casino (e.g., points may be more valuable for underused/less popular casino features, to drive players to use underutilized casino features). In some embodiments, points can expire, or decay in value according to a decaying algorithm. In some embodiments, the system can prevent expiration or decay of the points if the player continues to earn or use points within specific time periods.

Earning Awards Via Activity at a Casino.

In some embodiments, the system can provide awards (e.g., points, drink, free ride to airport) in response to a player's physical activities at a physical location (e.g., in response to getting a spa treatment at a casino resort).

Earning Points Via Third-Party and Group Activity.

In some embodiments, the system can provide points for convincing a friend to sign in at a casino. For example, if a group of players sign in at the same time at a casino (e.g., via a kiosk, via a wagering game machine), then all players will earn more points or earn points at a faster rate or a higher level.

Additional Example Operating Environments

This section describes example operating environments, systems and networks, and presents structural aspects of some embodiments. More specifically, this section includes discussion about wagering game and computer systems and architectures.

Wagering Game System Architecture

Figure 8:
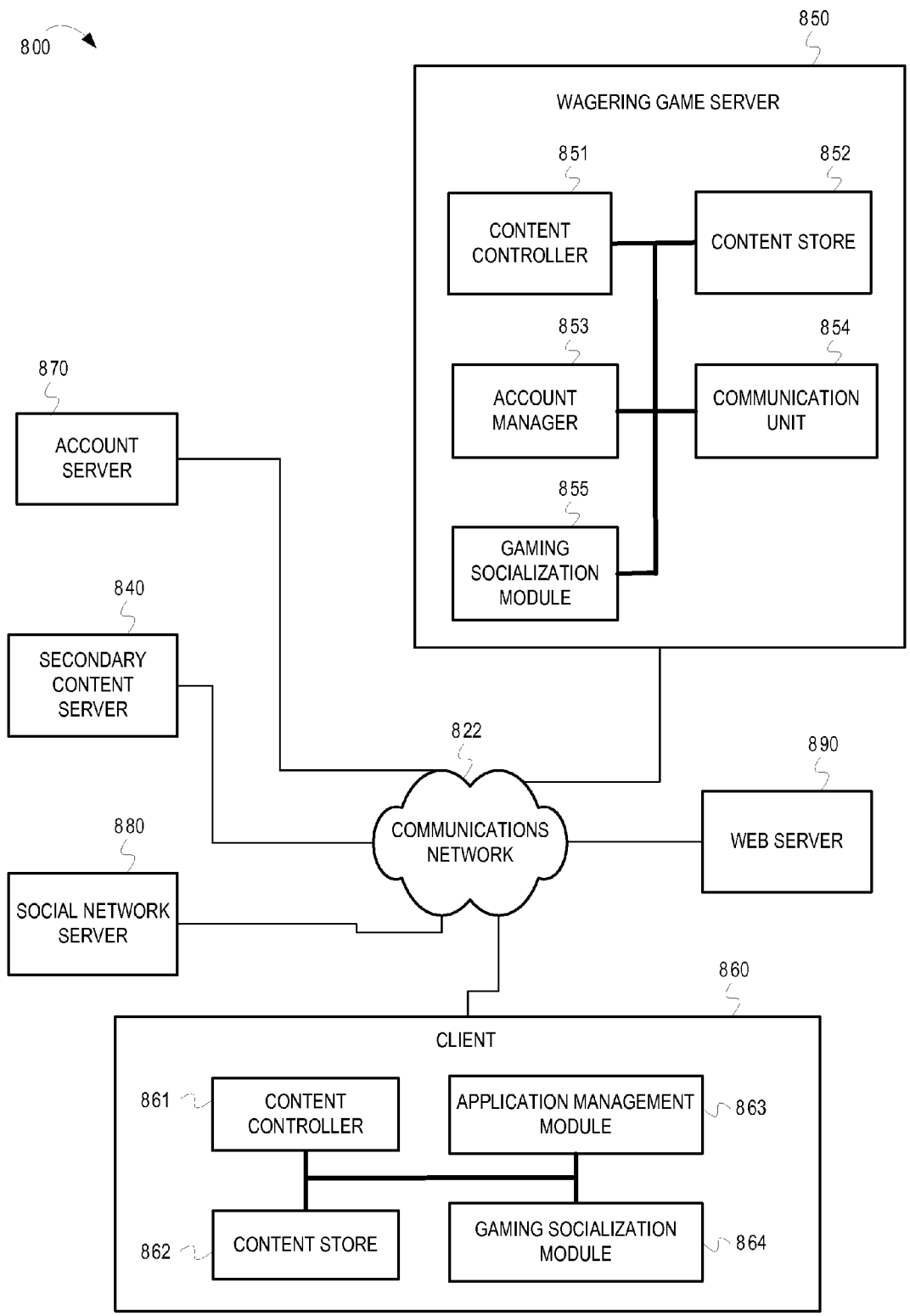
FIG. 8 is an illustration of a wagering game system architecture 800, according to some embodiments.

FIG. 8 is a conceptual diagram that illustrates an example of a wagering game system architecture 800, according to some embodiments. The wagering game system architecture 800 can include an account server 870 configured to control user related accounts accessible via wagering game networks and social networking networks. The account server 870 can store player account information, such as account settings (e.g., settings related to group games, etc., settings related to social contacts, etc.), preferences (e.g., player preferences regarding player loyalty points, player preferences regarding secondary content presentation, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 870 can contain lists of social contacts referenced by a player account. The account server 870 can also provide auditing capabilities, according to regulatory rules. The account server 870 can also track performance of players, machines, and servers.

The wagering game system architecture 800 can also include a wagering game server 850 configured to control wagering game content, provide random numbers, and communicate wagering game information, account information, and other information to and from a client 860. The wagering game server 850 can include a content controller 851 configured to manage and control content for the presentation of content on the client 860. For example, the content controller 851 can generate game results (e.g., win/loss values), including win amounts, for games played on the client 860. The content controller 851 can communicate the game results to the client 860. The content controller 851 can also generate random numbers and provide them to the client 860 so that the client 860 can generate game results. The wagering game server 850 can also include a content store 852 configured to contain content to present on the client 860. The wagering game server 850 can also include an account manager 853 configured to control information related to player accounts. For example, the account manager 853 can communicate wager amounts, game results amounts (e.g., win amounts), bonus game amounts, etc., to the account server 870. The wagering game server 850 can also include a communication unit 854 configured to communicate information to the client 860 and to communicate with other systems, devices and networks. The wagering game server 850 can also include a gaming socialization module 855 configured to track activities performed via player input including, but not limited to, gaming promotions, social communication publishing, affiliate gaming activities, wagering and redeeming player points, sharing status, etc. The gaming socialization module 855 is further configured to award player activity including, but not limited to, awarding points of varying degrees of values, tracking conditions for player promotions and social communication publishing, awarding affiliate gaming activities, awarding point wagers, etc.

The wagering game system architecture 800 can also include the client 860 configured to present wagering games and receive and transmit information to track and reward player activity. The client 860 can be a computer system, a personal digital assistant (PDA), a cell phone, a laptop, a wagering game machine, or any other device or machine that is capable of processing information, instructions, or other data provided via the communications network 822. The client 860 can include a content controller 861 configured to manage and control content and presentation of content on the client 860. The client 860 can also include a content store 862 configured to contain content to present on the client 860. The client 860 can also include an application management module 863 configured to manage multiple instances of gaming applications. For example, the application management module 863 can be configured to launch, load, unload and control applications and instances of applications. The application management module 863 can launch different software players (e.g., a Microsoft® Silverlight™ player, an Adobe® Flash® player, etc.) and manage, coordinate, and prioritize what the software players do. The application management module 863 can also coordinate instances of server applications in addition to local copies of applications. The application management module 863 can control window locations on a wagering game screen or display for the multiple gaming applications. In some embodiments, the application management module 863 can manage window locations on multiple displays including displays on devices associated with and/or external to the client 860 (e.g., a top display and a bottom display on the client 860, a peripheral device connected to the client 860, a mobile device connected to the client 860, etc.). The application management module 863 can manage priority or precedence of client applications that compete for the same display area. For instance, the application management module 863 can determine each client application's precedence. The precedence may be static (i.e. set only when the client application first launches or connects) or dynamic. The applications may provide precedence values to the application management module 863, which the application management module 863 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 863 of its current presentation state. The applications may provide presentation state values to the application management module 863, which the application management module 863 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 863 can be pre-configurable. The system can provide controls and interfaces for operators to control screen layouts and other presentation features for the configuring the application management module 863. The application management module 863 can communicate with, and/or be a communication mechanism for, a base game stored on a wagering game machine. For example, the application management module 863 can communicate events from the base game such as the base game state, pay line status, bet amount status, etc. The application management module 863 can also provide events that assist and/or restrict the base game, such as providing bet amounts from secondary gaming applications, inhibiting play based on gaming event priority, etc. The application management module 863 can also communicate some (or all) financial information between the base game and other applications including amounts wagered, amounts won, base game outcomes, etc. The application management module 863 can also communicate pay table information such as possible outcomes, bonus frequency, etc. In some embodiments, the application management module 863 can control different types of applications. For example, the application management module 863 can perform rendering operations for presenting applications of varying platforms, formats, environments, programming languages, etc. For example, the application management module 863 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 863 can include a portable virtual machine capable of generating and executing code for the varying platforms, formats, environments, programming languages, etc. The application management module 863 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.). The client 860 can also include a gaming socialization module 864 configured to track activities performed via player input including, but not limited to, gaming promotions, social communication publishing, affiliate gaming activities, wagering and redeeming player points, sharing status, etc. The gaming socialization module 864 is further configured to award player activity including, but not limited to, awarding points of varying degrees of values, tracking conditions for player promotions and social communication publishing, awarding affiliate gaming activities, awarding point wagers, etc.

The wagering game system architecture 800 can also include a secondary content server 840 configured to provide content and control information for secondary games and other secondary content available on a wagering game network (e.g., secondary wagering game content, promotions content, advertising content, player tracking content, web content, etc.). The secondary content server 840 can provide "secondary" content, or content for "secondary" games presented on the client 860. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 840 can provide and control content for community games, including networked games, social games, competitive games, or any other game that multiple players can participate in at the same time. In some embodiments, the secondary content server 840 can control and present an online website that hosts wagering games. The secondary content server 840 can also be configured to present multiple wagering game applications on the client 860 via a wagering game website, or other gaming-type venue accessible via the Internet. The secondary content server 840 can host an online wagering website and/or a social networking website. The secondary content server 840 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 840 can also be configured to track activities performed via player input including, but not limited to, gaming promotions, social communication publishing, affiliate gaming activities, wagering and redeeming player points, sharing status, etc. The secondary content server 840 can be further configured to award player activity including, but not limited to, awarding points of varying degrees of values, tracking conditions for player promotions and social communication publishing, awarding affiliate gaming activities, awarding point wagers, etc. In some embodiments, the secondary content server 840 can also host social networking accounts, provide social networking content, control social networking communications, store associated social contacts, etc. The secondary content server 840 can also provide chat functionality for a social networking website, a chat application, or any other social networking communications mechanism. In some embodiments, the secondary content server 840 can utilize player data to determine marketing promotions that may be of interest to a player account. The secondary content server 840 can also analyze player data and generate analytics for players, group players into demographics, integrate with third party marketing services and devices, etc. The secondary content server 840 can also provide player data to third parties that can use the player data for marketing.

The wagering game system architecture 800 can also include a social network server 880 configured to host social networking network accounts, provide social networking content, control social networking communications, store associated social contacts, etc. In some embodiments, the social network server 880 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 800 can also include a web server 890 configured to control and present an online website that hosts wagering games. The web server 890 can also be configured to present multiple wagering game applications on the client 860 via a wagering game website, or other gaming-type venue accessible via the Internet. The web server 890 can host an online wagering website and/or a social networking website. The web server 890 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The web server 890 can also be configured to track activities performed via player input including, but not limited to, gaming promotions, social communication publishing, affiliate gaming activities, wagering and redeeming player points, sharing status, etc. The web server 890 can further be configured to award player activity including, but not limited to, awarding points of varying degrees of values, tracking conditions for player promotions and social communication publishing, awarding affiliate gaming activities, awarding point wagers, etc.

Each component shown in the wagering game system architecture 800 is shown as a separate and distinct element connected via a communications network 822. However, some functions performed by one component could be performed by other components. For example, the wagering game server 850 can also be configured to perform functions of the secondary content server 840, the social network server 880, the web server 890, and other network elements and/or system devices. Furthermore, the components shown may all be contained in one device, but some, or all, may be included in, or performed by, multiple devices, as in the configurations shown in FIG. 8 or other configurations not shown. For example, the account manager 853 and the communication unit 854 can be included in the client 860 instead of, or in addition to, being a part of the wagering game server 850. Further, in some embodiments, the client 860 can determine wagering game outcomes, generate random numbers, etc. instead of, or in addition to, the wagering game server 850.

As mentioned previously, in some embodiments, the client 860 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 800 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Computer System

Figure 9:
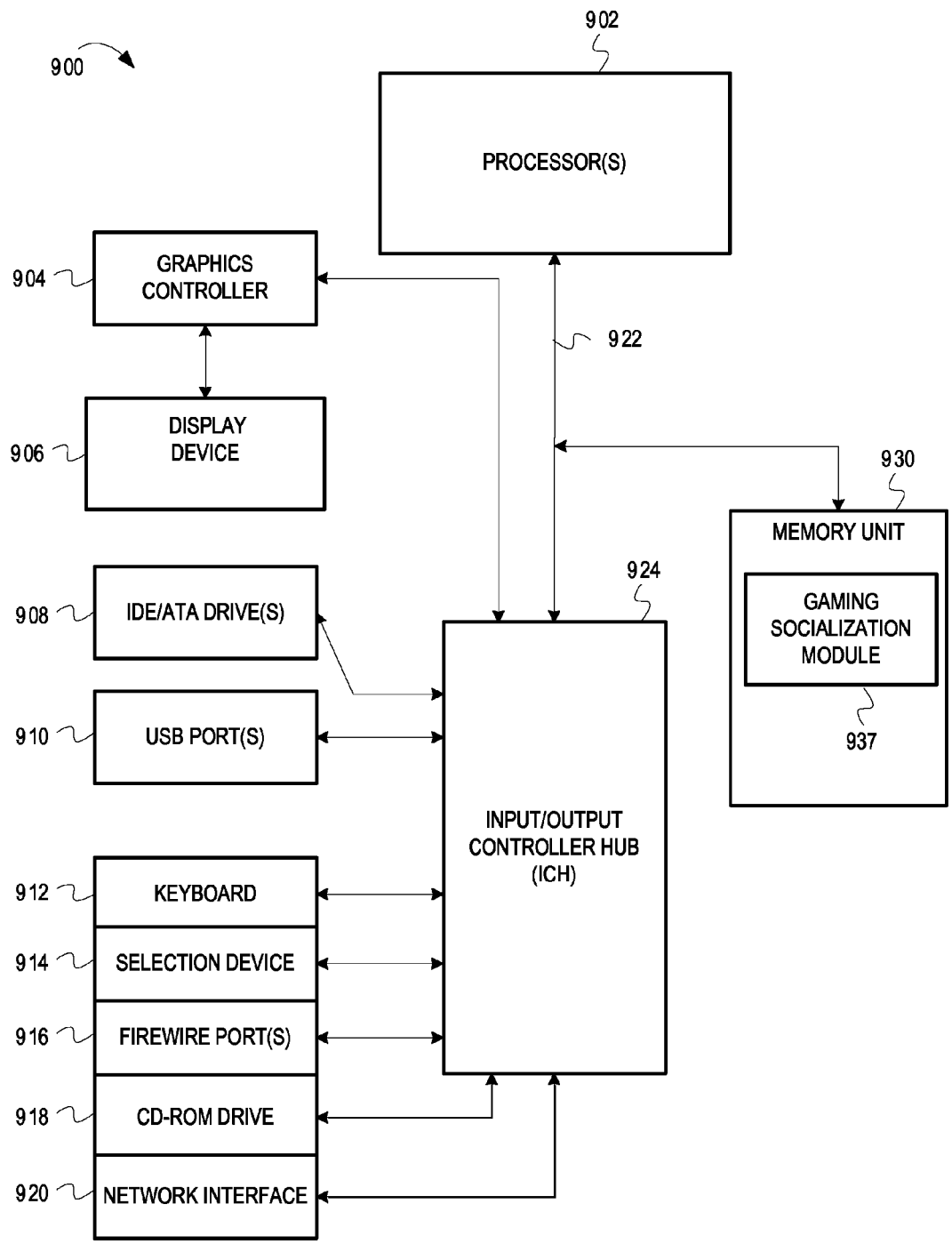
FIG. 9 is an illustration of a wagering game computer system 900, according to some embodiments.

FIG. 9 is a conceptual diagram that illustrates an example of a wagering game computer system 900, according to some embodiments. In FIG. 9, the wagering game computer system ("computer system") 900 may include a processor unit 902, a memory unit 930, a processor bus 922, and an Input/Output controller hub (ICH) 924. The processor unit 902, memory unit 930, and ICH 924 may be coupled to the processor bus 922. The processor unit 902 may comprise any suitable processor architecture. The computer system 900 may comprise one, two, three, or more processors, any of which may execute a set of instructions in accordance with some embodiments.

The memory unit 930 may also include an I/O scheduling policy unit and I/O schedulers. The memory unit 930 can store data and/or instructions, and may comprise any suitable memory, such as a dynamic random access memory (DRAM), for example. The computer system 900 may also include one or more suitable integrated drive electronics (IDE) drive(s) 908 and/or other suitable storage devices. A graphics controller 904 controls the display of information on a display device 906, according to some embodiments.

The ICH 924 provides an interface to I/O devices or peripheral components for the computer system 900. The ICH 924 may comprise any suitable interface controller to provide for any suitable communication link to the processor unit 902, memory unit 930 and/or to any suitable device or component in communication with the ICH 924. The ICH 924 can provide suitable arbitration and buffering for each interface.

For one embodiment, the ICH 924 provides an interface to the one or more IDE drives 908, such as a hard disk drive (HDD) or compact disc read only memory (CD ROM) drive, or to suitable universal serial bus (USB) devices through one or more USB ports 910. For one embodiment, the ICH 924 also provides an interface to a keyboard 912, selection device 914 (e.g., a mouse, trackball, touchpad, etc.), CD-ROM drive 918, and one or more suitable devices through one or more firewire ports 916. For one embodiment, the ICH 924 also provides a network interface 920 though which the computer system 900 can communicate with other computers and/or devices.

The computer system 900 may also include a machine-readable storage medium that stores a set of instructions (e.g., software) embodying any one, or all, of the methodologies for control and reward gaming-related socialization. Furthermore, software can reside, completely or at least partially, within the memory unit 930 and/or within the processor unit 902. The computer system 900 can also include a gaming socialization module 937. The gaming socialization module 937 can process communications, commands, or other information, to control and reward gaming-related socialization. Any component of the computer system 900 can be implemented as hardware, firmware, and/or machine-readable storage media including instructions for performing the operations described herein.

Personal Wagering Game System

Figure 10:
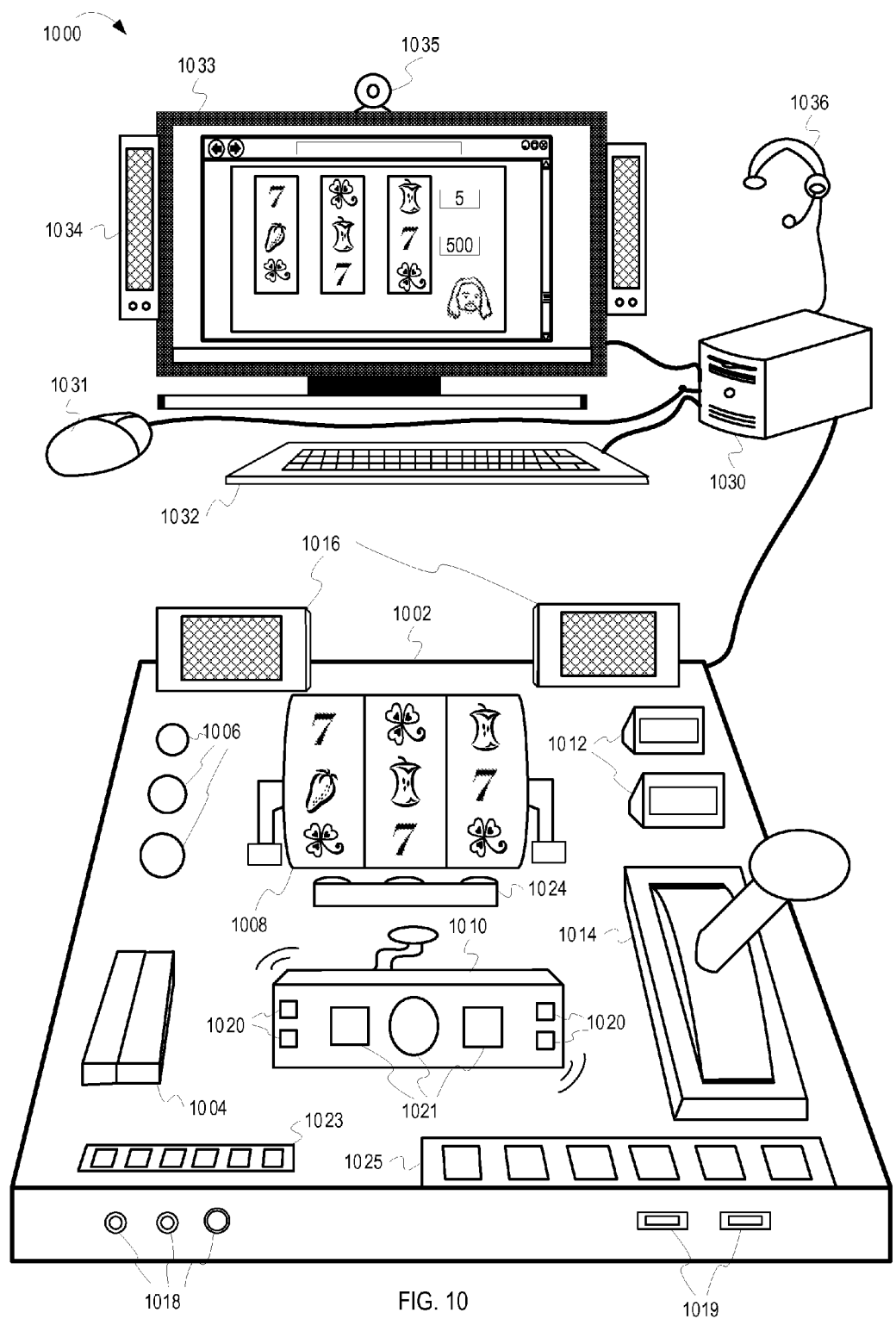
FIG. 10 is an illustration of a personal wagering game system 1000, according to some embodiments.

FIG. 10 is a conceptual diagram that illustrates an example of a personal wagering game system 1000, according to some embodiments. In FIG. 10, the personal wagering game system ("system") 1000 includes an exemplary computer system 1030 connected to several devices, including user input devices (e.g., a keyboard 1032, a mouse 1031), a web-cam 1035, a monitor 1033, speakers 1034, and a headset 1036 that includes a microphone and a listening device. In some embodiments, the webcam 1035 can detect fine details of a person's facial features, from an eye-level perspective. The web-cam 1035 can use the fine detail to determine a person's identity, their demeanor, their facial expressions, their mood, their activities, their eye focus, etc. The headset 1036 can include biometric sensors configured to detect voice patterns, spoken languages, spoken commands, etc. The biometric sensors in the web-cam 1035 can detect colors (e.g., skin colors, eye colors, hair colors, clothing colors, etc.) and textures (e.g., clothing material, scars, etc.). The biometric sensors in the web-cam 1035 can also measure distances between facial features (e.g., distance between eyes, distance from eyes to nose, distance from nose to lips, length of lips, etc.). The system 1000 can generate a facial and body map using the detected colors, textures, and facial measurements. The system 1000 can use the facial and body map to generate similar facial features and body appearances for a player account avatar. Also connected to the computer system 1030 is a gaming control device ("gaming pad") 1002 including wagering game accoutrements associated with wagering games. The wagering game accoutrements include one or more of reels 1008, game meters 1012, indicators 1006, a game control device 1010, a physical lever 1014, a magnetic card reader 1004, a video projection device 1024, input/output ports 1018, USB ports 1019, and speakers 1016. The gaming pad 1002 can present feedback of online activities. For instance, the gaming pad 1002 can use vibrations and signals on the gaming control device (e.g., the game control device 1010 or the physical lever 1014 can vibrate to indicate a back pat from another player or a game celebration, the indicators 1006 can blink, etc.). The physical lever 1014 can produce feelings in the lever to emulate a pulling feel or a vibration. The video projection device 1024 can project video onto the reels 1008 so that the reels 1008 can present many different types of wagering games. The reels 1008 can spin when the physical lever 1014 is pulled. The video projection device 1024 can project reel icons onto the reels 1008 as they spin. The video projection device 1024 can also project reel icons onto the reels 1008 when the reels 1008 are stationary, but the imagery from the video project device 1024 makes the reels 1008 appear to spin. The magnetic card reader 1004 can be used to swipe a credit card, a player card, or other cards, so that the system can quickly get information. The system 1000 can offer lower rates for using the magnetic card reader 1004 (e.g., to get a lower rate per transaction). The game control device 1010 can include an emotion indicator keypad with keys 1020 that a player can use to indicate emotions. The game control device 1010 can also include biometric devices 1021 such as a heart-rate monitor, an eye pupil dilation detector, a fingerprint scanner, a retinal scanner, voice detectors, speech recognition microphones, motion sensors, sound detectors, etc. The biometric devices 1021 can be located in other places, such as in the headset 1036, within a chair (not shown), within personal control devices (e.g. joysticks, remote controls, game pads, roller-balls, touch-pads, touch-screens, etc.), within the web-cam 1035, or any other external device. The external devices can be connected to the computer 1030 or to the game control device 1010 via the input/output ports 1018. As a security feature, some biometric devices can be associated with some of the gaming pad devices (e.g., the magnetic card reader 1004), such as a fingerprint scanner, a retinal scanner, a signature pad to recognize a player's signature, etc. The game control device 1010 can also use the keys 1020 to share items and control avatars, icons, game activity, movement, etc. within a network wagering venue. The game pad can also have an electronic (e.g., digital) button panel 1025, an electronic control panel 1023, or any other type of changeable panel that can change appearance and/or configuration based on the game being played, the action being performed, and/or other activity presented within an online gaming venue. The game control device 1010 can also move in different directions to control activity within the online gaming venue (e.g., movement of a player's avatar moves in response to the movements of the game control device 1010). Avatars can be pre-programmed to act and look in certain ways, which the player can control using the system 1000. The gaming pad 1002 can permit the player to move the avatar fluidly and more easily than is possible using a standard keyboard. The system 1000 can cause an avatar to respond to input that a player receives via the gaming pad 1002. For example, a player may hear a sound that comes primarily from one direction (e.g., via stereophonic signals in the headset 1036) within the network wagering venue. The system 1000 can detect the movement of the player (e.g., the system 1000 detects that a player moves his head to look in the direction of the sound, the player uses the game control device 1010 to move the avatar's perspective to the direction of the sound, etc.). The system 1000 can consequently move the avatar's head and/or the avatar's perspective in response to the player's movement. The player can indicate an expression of an emotion indicated by the player using the keys 1020. The system 1000 can make the avatar's appearance change to reflect the indicated emotion. The system 1000 can respond to other movements or actions by the player and fluidly move the avatar to respond. The system 1000 can also interpret data provided by the biometric devices and determine expressions and/or indications of emotions for a player using the system 1000.

Wagering Game Machine Architecture

Figure 11:
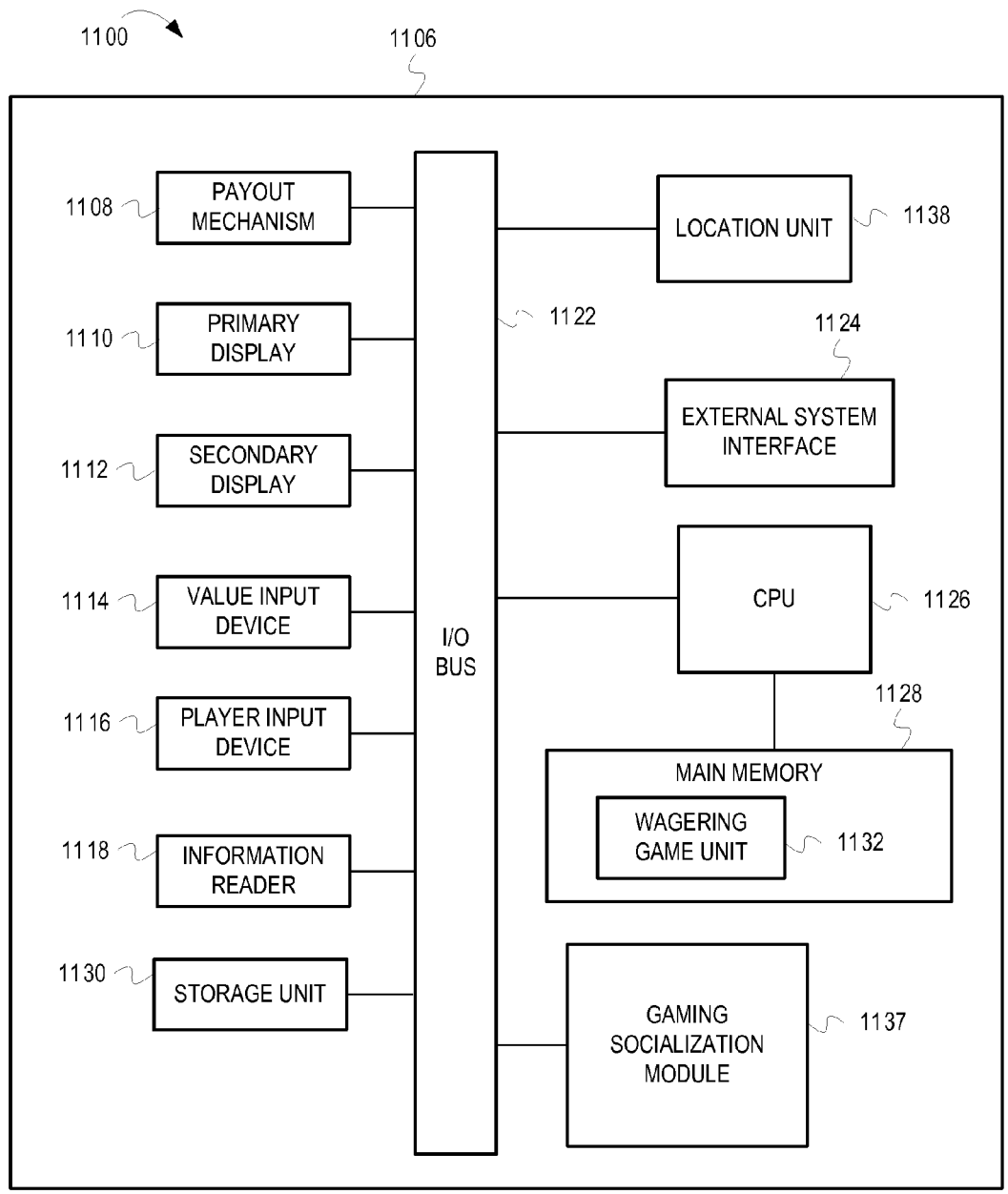
FIG. 11 is an illustration of a wagering game machine architecture 1100, according to some embodiments.

FIG. 11 is a conceptual diagram that illustrates an example of a wagering game machine architecture 1100, according to some embodiments. In FIG. 11, the wagering game machine architecture 1100 includes a wagering game machine 1106, which includes a central processing unit (CPU) 1126 connected to main memory 1128.
The CPU 1126 can include any suitable processor, such as an Intel® Pentium processor, Intel® Core 2 Duo processor, AMD Opteron™ processor, or UltraSPARC processor. The main memory 1128 includes a wagering game unit 1132. In some embodiments, the wagering game unit 1132 can present wagering games, such as video poker, video black jack, video slots, video lottery, reel slots, etc., in whole or part.

The CPU 1126 is also connected to an input/output ("I/O") bus 1122, which can include any suitable bus technologies, such as an AGTL+ frontside bus and a PCI backside bus. The I/O bus 1122 is connected to a payout mechanism 1108, primary display 1110, secondary display 1112, value input device 1114, player input device 1116, information reader 1118, and storage unit 1130. The player input device 1116 can include the value input device 1114 to the extent the player input device 1116 is used to place wagers. The I/O bus 1122 is also connected to an external system interface 1124, which is connected to external systems (e.g., wagering game networks). The external system interface 1124 can include logic for exchanging information over wired and wireless networks (e.g., 802.11g transceiver, Bluetooth transceiver, Ethernet transceiver, etc.)

The I/O bus 1122 is also connected to a location unit 1138. The location unit 1138 can create player information that indicates the wagering game machine's location/movements in a casino. In some embodiments, the location unit 1138 includes a global positioning system (GPS) receiver that can determine the wagering game machine's location using GPS satellites. In other embodiments, the location unit 1138 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 11, in some embodiments, the location unit 1138 is not connected to the I/O bus 1122.

In some embodiments, the wagering game machine 1106 can include additional peripheral devices and/or more than one of each component shown in FIG. 11. For example, in some embodiments, the wagering game machine 1106 can include multiple external system interfaces 1124 and/or multiple CPUs 1126. In some embodiments, any of the components can be integrated or subdivided.

In some embodiments, the wagering game machine 1106 includes a gaming socialization module 1137. The gaming socialization module 1137 can process communications, commands, or other information, where the processing can control and reward gaming-related socialization.

Furthermore, any component of the wagering game machine 1106 can include hardware, firmware, and/or machine-readable storage media including instructions for performing the operations described herein.

Wagering Game Machine

Figure 12:
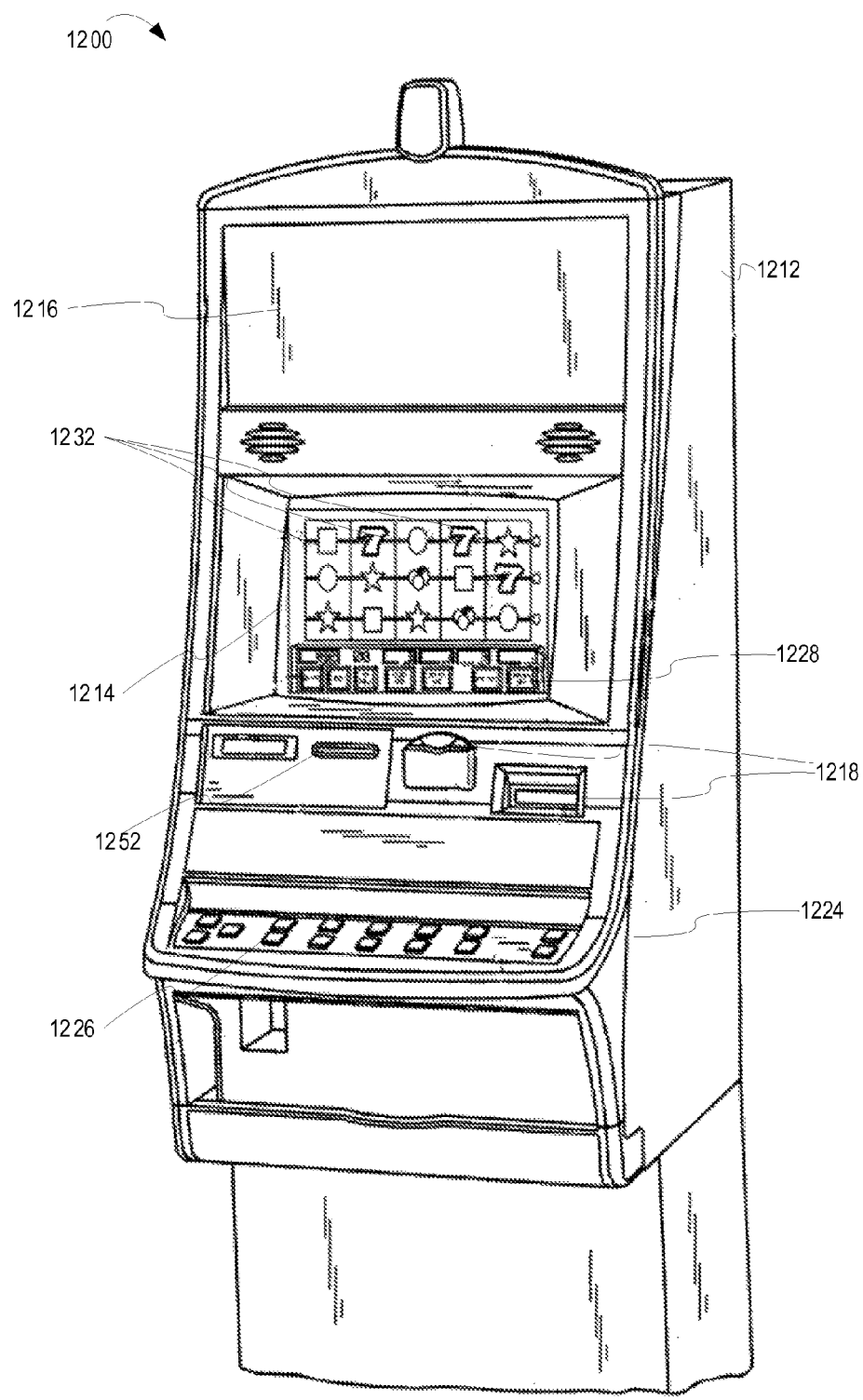
FIG. 12 is an illustration of a wagering game machine 1200, according to some embodiments.

FIG. 12 is a conceptual diagram that illustrates an example of a wagering game machine 1200, according to some embodiments. Referring to FIG. 12, the wagering game machine 1200 can be used in gaming establishments, such as casinos. According to some embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bar top model, mobile handheld model, or workstation console model.

A player begins playing a basic wagering game by making a wager via the value input device 1218. The player can initiate play by using the player input device's buttons or touch screen 1228. The basic game can include arranging a plurality of symbols 1232 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:
   receiving a message that was published from a social-communication application of a social network website;
   detecting that the message originated from a social networking account that is associated with a player account controlled, at least in part, via a wagering game server;
   selecting a first phrase from the message;
   comparing the first phrase to a plurality of second phrases accessible via the wagering game server, wherein the plurality of second phrases describe characteristics associated with a wagering game venue;
   detecting, via at least one of one or more processors, that the first phrase is equivalent to at least one of the plurality of the second phrases; and
   providing, via at least one of the one or more processors, an award after detecting that the first phrase is equivalent to the at least one of the plurality of second phrases.

2. The computer-implemented method of claim 1 further comprising:
   assigning a value to the award based on a number of times that the message is republished in association with one or more additional social networking accounts associated with the social networking account.

3. The computer-implemented method of claim 1, wherein said selecting the first phrase from the message comprises:
   parsing the message; and
   detecting one or more tags within the message that specify the first phrase as a gaming-related promotional statement, wherein the one or more tags are accessible via the wagering game server, and wherein the detecting the one or more tags is in response to said parsing the message.

4. The computer-implemented method of claim 1 further comprising:
   detecting a condition related to a publication of the message;
   detecting that the publication of the message satisfies the condition; and
   assigning a first value to the award based on a second value associated with the condition.

5. The computer-implemented method of claim 4, wherein said detecting that the publication of the message satisfies the condition comprises one or more of detecting that the message is published within a specific time period, detecting that the first phrase causes an upward trend in a communication stream associated with the social networking website, and detecting that the message is republished via an affiliated user account.

6. The computer-implemented method of claim 1, wherein the social-communication application publishes the message via one or more of a blog post, a micro-blog post, an update to a profile status, a news feed post, a mass chat feed post, a mass text message broadcast, and a forum post.

7. An apparatus comprising:
   one or more processors; and
   a gaming socialization module configured to, via the one or more processors,
       detect a publication of a message that was published via a social-communication mechanism,
       detect that the message originated from a social networking account that is associated with a player account controlled, at least in part, via a wagering game server;
       perform analysis of the message,
       determine, via the analysis of the message, that the message contains at least one promotional phrase from a list of promotional phrases that promote a wagering game venue,
       award loyalty points in response to said detecting that the message contains the at least one promotional phrase, and
       assign a value to the loyalty points based on a condition associated with the publication of the message.

8. The apparatus of claim 7, wherein the gaming socialization module is further configured to:
   detect a value of significance associated with the condition, and
   assign a point augmentation value to the loyalty points proportional to the value of significance.

9. The apparatus of claim 7, wherein the gaming socialization module is further configured to:
   detect usage of a tag in the message, and
   assign a value to the loyalty points based on the usage of the tag.

10. The apparatus of claim 7, wherein the gaming socialization module is further configured to:
    assign a gaming-benefit attribute to the loyalty points, wherein the gaming-benefit attribute grants access to a feature of the wagering game venue based on a level of status of the player account associated with the publication of the message;
    detect usage of the loyalty points via the wagering game venue; and
    provide access to the feature of the wagering game venue in response to the usage of the loyalty points.

11. A system comprising:
    one or more processors; and
    one or more memory storage devices configured to store instructions, which when executed by at least one of the one or more processors, cause the system to perform operations to
        receive a message that was published from a social-communication application of a social network website;
        detect that the message originated from a social networking account that is associated with a player account controlled, at least in part, via a wagering game server;
        select a first phrase from the message;
        compare the first phrase to a plurality of second phrases accessible via the wagering game server, wherein the plurality of second phrases describe characteristics associated with a wagering game venue;
        detect that the first phrase is equivalent to at least one of the plurality of the second phrases; and
        provide an award in response to said detecting that the first phrase is equivalent to the at least one of the plurality of second phrases.

12. The system of claim 11, wherein the one or more memory storage devices are configured to store instructions, which when executed by at least one of the one or more processors, cause the system to further perform operations to:
    assign a value to the award based on a number of times that the message is republished in association with one or more additional social networking accounts associated with the social networking account.

13. The system of claim 11, wherein the operation to select the first phrase from the message includes operations to:
parse the message; and
detect one or more tags within the message that specify the first phrase as a gaming-related promotional statement, wherein the one or more tags are accessible via the wagering game server.

14. The system of claim 11, wherein the one or more memory storage devices are configured to store instructions, which when executed by at least one of the one or more processors, cause the system to further perform operations to:
detect a condition related to a publication of the message;
detect that the publication of the message satisfies the condition; and
assign a first value to the award based on a second value associated with the condition.

15. The system of claim 14, wherein the operation to detect that the publication of the message satisfies the condition includes one or more operations to one or more of detect that the message is published within a specific time period, detect that the first phrase causes an upward trend in a communication stream associated with the social networking website, and detect that the message is republished via an affiliated user account.

16. The system of claim 11, wherein the social-communication application publishes the message via one or more of a blog post, a micro-blog post, an update to a profile status, a news feed post, a mass chat feed post, a mass text message broadcast, and a forum post.

17. One or more non-transitory, machine-readable storage media having instructions stored thereon, which when executed by a set of one or more processors causes the set of one or more processors to perform operations comprising:
detecting a publication of a message that was published via a social-communication mechanism,
detecting that the message originated from a social networking account that is associated with a player account controlled, at least in part, via a wagering game server;
performing analysis of the message,
determining, via the analysis of the message, that the message contains at least one promotional phrase from a list of promotional phrases that promote a wagering game venue,
awarding loyalty points in response to said detecting that the message contains the at least one promotional phrase, and
assigning a value to the loyalty points based on a condition associated with the publication of the message.

18. The one or more non-transitory, machine-readable media of claim 17, said operations further comprising:
detecting a value of significance associated with the condition; and
assigning a point augmentation value to the loyalty points proportional to the value of significance.

19. The one or more non-transitory, machine-readable media of claim 17, said operations further comprising:
detecting usage of a tag in the message; and
assigning a value to the loyalty points based on the usage of the tag.

20. The one or more non-transitory, machine-readable media of claim 17, said operations further comprising:
assigning a gaming-benefit attribute to the loyalty points, wherein the gaming-benefit attribute grants access to a feature of the wagering game venue based on a level of status of a player account associated with the publication of the message;
detecting usage of the loyalty points via the wagering game venue; and
providing access to the feature of the wagering game venue after detecting the usage of the loyalty points.

21. A computer-implemented method comprising:
receiving a message that was published from a social-communication application of a social network website;
selecting a first phrase from the message;
comparing the first phrase to a plurality of second phrases accessible via a wagering game server, wherein the plurality of second phrases describe characteristics associated with a wagering game venue;
detecting, via at least one of one or more processors, that the first phrase is equivalent to at least one of the plurality of the second phrases;
detecting a condition related to a publication of the message;
detecting that the publication of the message satisfies the condition, wherein the detecting that the publication of the message satisfies the condition comprises one or more of detecting that the message is published within a specific time period, detecting that the first phrase causes an upward trend in a communication stream associated with the social networking website, and detecting that the message is republished via an affiliated user account;
assigning a first value for an award based on a second value associated with the condition; and
providing, via at least one of the one or more processors, the award after detecting that the first phrase is equivalent to the at least one of the plurality of second phrases.

22. One or more non-transitory, machine-readable storage media having instructions stored thereon, which when executed by a set of one or more processors causes the set of one or more processors to perform operations comprising:
receiving a message that was published from a social-communication application of a social network website;
selecting a first phrase from the message;
comparing the first phrase to a plurality of second phrases accessible via a wagering game server, wherein the plurality of second phrases describe characteristics associated with a wagering game venue;
detecting that the first phrase is equivalent to at least one of the plurality of the second phrases;
detecting a condition related to a publication of the message;
detecting that the publication of the message satisfies the condition, wherein the detecting that the publication of the message satisfies the condition comprises one or more of detecting that the message is published within a specific time period, detecting that the first phrase causes an upward trend in a communication stream associated with the social networking website, and detecting that the message is republished via an affiliated user account;
assigning a first value for an award based on a second value associated with the condition; and
providing the award after detecting that the first phrase is equivalent to the at least one of the plurality of second phrases.

23. An apparatus comprising:
one or more processors; and
one or more memory storage devices configured to store instructions, which when executed by at least one of the one or more processors cause the apparatus to perform operations to detect a publication of a message that was published via a social-communication mechanism,
perform analysis of the message,
determine, via the analysis of the message, that the message contains at least one promotional phrase from a list of promotional phrases that promote a wagering game venue,
award loyalty points in response to said detecting that the message contains the at least one promotional phrase,
assign a value to the loyalty points based on a condition associated with the publication of the message,
assign a gaming-benefit attribute to the loyalty points, wherein the gaming-benefit attribute grants access to a feature of the wagering game venue based on a level of status of a player account associated with the publication of the message,
detect usage of the loyalty points via the wagering game venue, and
provide access to the feature of the wagering game venue in response to the usage of the loyalty points.

24. A computer-implemented method comprising:
detecting a publication of a message that was published via a social-communication mechanism;
performing, via at least one of one or more processors, analysis of the message;
determining, via the analysis of the message, that the message contains at least one promotional phrase from a list of promotional phrases that promote a wagering game venue;
awarding loyalty points in response to said detecting that the message contains the at least one promotional phrase;
assigning a value to the loyalty points based on a condition associated with the publication of the message;
assigning, via at least one of one or more processors, a gaming-benefit attribute to the loyalty points, wherein the gaming-benefit attribute grants access to a feature of the wagering game venue based on a level of status of a player account associated with the publication of the message;
detecting usage of the loyalty points via the wagering game venue; and
providing access to the feature of the wagering game venue in response to the usage of the loyalty points.

* * * * *